United States Patent
Isobe et al.

(10) Patent No.: US 11,141,915 B2
(45) Date of Patent: Oct. 12, 2021

(54) THREE-DIMENSIONAL SHAPING DEVICE

(71) Applicant: NTN CORPORATION, Osaka (JP)

(72) Inventors: Hiroshi Isobe, Iwata (JP); Katsunori Sone, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/388,409

(22) Filed: Apr. 18, 2019

(65) Prior Publication Data

US 2019/0240903 A1  Aug. 8, 2019

Related U.S. Application Data

(63) Continuation of application No. PCT/JP2017/038143, filed on Oct. 23, 2017.

(30) Foreign Application Priority Data

Oct. 28, 2016 (JP) .............................. JP2016-211263

(51) Int. Cl.
*B29C 64/245* (2017.01)
*B29C 64/232* (2017.01)
(Continued)

(52) U.S. Cl.
CPC ............ *B29C 64/245* (2017.08); *B29C 64/20* (2017.08); *B29C 64/232* (2017.08);
(Continued)

(58) Field of Classification Search
CPC ..... B29C 64/245; B29C 64/20; B29C 64/232; B29C 64/236; B29C 64/241; B33Y 30/00
See application file for complete search history.

(56) References Cited

U.S. PATENT DOCUMENTS 5,059,266 A * 10/1991 Yamane .................. B29C 41/08
156/64
9,243,696 B2    1/2016 Isobe et al.
(Continued)

FOREIGN PATENT DOCUMENTS

CN        103827547        5/2014
CN        104859147 A      8/2015
(Continued)

OTHER PUBLICATIONS

Extended European Search Report dated May 29, 2020 in corresponding European Patent Application No. 17864318.5.
(Continued)

*Primary Examiner* — Timothy Kennedy
*Assistant Examiner* — Jerzi H Moreno Hernandez

(57) ABSTRACT

A three-dimensional shaping device includes: a discharge head for discharging fluidic raw material through a nozzle; a shaping table on which a shaped product is to be molded; a linear motion mechanism; and a rotation unit. The linear motion mechanism moves the shaping table relative to the discharge head in three mutually orthogonal axial directions. The rotation unit tilts the shaping table relative to the discharge head. An operation of curing, on the shaping table, the raw material discharged through the nozzle is repeated while the relative position between the discharge head and the shaping table is being changed by the linear motion mechanism and the rotation unit, thereby molding a shaped product in which the cured raw material is stacked in layers.

4 Claims, 19 Drawing Sheets

(51) Int. Cl.
  *B29C 64/236* (2017.01)
  *B33Y 30/00* (2015.01)
  *B29C 64/241* (2017.01)
  *B29C 64/20* (2017.01)

(52) U.S. Cl.
  CPC .......... *B29C 64/236* (2017.08); *B29C 64/241* (2017.08); *B33Y 30/00* (2014.12)

(56) References Cited

U.S. PATENT DOCUMENTS

| | | | |
|---|---|---|---|
| 9,321,215 | B2 | 4/2016 | Dudley |
| 9,481,131 | B2 | 11/2016 | Yerazunis et al. |
| 9,550,319 | B2 | 1/2017 | Larsen et al. |
| 9,821,454 | B2 | 11/2017 | Isobe et al. |
| 10,350,874 | B2 | 7/2019 | Yerazunis et al. |
| 10,603,838 | B2 | 3/2020 | Deng et al. |
| 2005/0159075 | A1* | 7/2005 | Isobe ............... B25J 9/0048 446/104 |
| 2014/0197576 | A1* | 7/2014 | Kraibuhler ......... B33Y 30/00 264/308 |
| 2014/0224046 | A1* | 8/2014 | Isobe ............... F16H 19/08 74/89.14 |
| 2014/0265034 | A1 | 9/2014 | Dudley |
| 2015/0021830 | A1 | 1/2015 | Yerazunis et al. |
| 2015/0224699 | A1 | 8/2015 | Larsen et al. |
| 2016/0052205 | A1 | 2/2016 | FrantzDale |
| 2016/0068793 | A1* | 3/2016 | Maggiore .......... B29C 64/227 435/289.1 |
| 2016/0107378 | A1 | 4/2016 | Davis et al. |
| 2016/0195141 | A1* | 7/2016 | Sone ............... F16C 19/06 464/111 |
| 2016/0256998 | A1 | 9/2016 | Isobe et al. |
| 2017/0021573 | A1 | 1/2017 | Yerazunis et al. |
| 2017/0165915 | A1 | 6/2017 | Deng et al. |
| 2018/0065180 | A1 | 3/2018 | Machida et al. |

FOREIGN PATENT DOCUMENTS

| | | | | |
|---|---|---|---|---|
| CN | 105209240 | A | 12/2015 | |
| CN | 105398053 | A | 3/2016 | |
| CN | 105408092 | A | 3/2016 | |
| CN | 105599294 | A | 5/2016 | |
| CN | 105818393 | A | 8/2016 | |
| EP | 1886793 | B1 * | 3/2011 | .......... B29C 64/112 |
| EP | 3 072 644 | A1 | 9/2016 | |
| JP | 2005-59289 | | 3/2005 | |
| JP | 2014-516841 | | 7/2014 | |
| JP | WO 2012/171644 | | 7/2014 | |
| JP | 2015102125 | A | 6/2015 | |
| JP | 2015-147414 | | 8/2015 | |
| JP | 2016-35430 | | 3/2016 | |
| JP | 2016-141142 | | 8/2016 | |
| JP | 2016153159 | A | 8/2016 | |
| WO | WO2014165265 | A1 | 10/2014 | |
| WO | 2015/008670 | A1 | 1/2015 | |
| WO | WO 2016/030782 | A1 | 3/2016 | |
| WO | WO2016147446 | A1 | 9/2016 | |

OTHER PUBLICATIONS

English Translation by WIPO of the International Preliminary Report on Patentability dated May 9, 2019 in corresponding International Patent Application No. PCT/JP2017/038143 (10 pages).
Chinese Office Action dated Sep. 10, 2020, in corresponding Chinese Patent Application No. 201780066141.5 (13 pp.).
Notice of Reasons for Refusal dated Sep. 23, 2020, in corresponding Japanese Patent Application No. 2016-211263 (9 pp.).
Chinese Office Action dated May 17, 2021 in Chinese Patent Application No. 201780066141.5, 10 pages with translation.
Chinese Office Action dated Mar. 1, 2021, in Chinese Patent Application No. 201780066141.5, 12 pages including translation.
International Search Report dated Dec. 19, 2017 in corresponding International Application No. PCT/JP2017/038143.

* cited by examiner

THREE-DIMENSIONAL SHAPING DEVICE

CROSS REFERENCE TO THE RELATED APPLICATION

This application is a continuation application, under 35 U.S.C. § 111(a) of international patent application No. PCT/JP2017/038143, filed Oct. 23, 2017, which claims priority to Japanese patent application No. 2016-211263, filed Oct. 28, 2016, the entire disclosure of which is herein incorporated by reference as a part of this application.

BACKGROUND OF THE INVENTION

Field of the Invention

The present invention relates to a three-dimensional shaping device for molding an arbitrary shaped product by discharging raw material through a nozzle, curing the raw material, and depositing the raw material.

Description of Related Art

As three-dimensional shaping methods, the following methods have been known: a fused deposition modeling method of stacking layers of thermally fusible resin one by one, thereby molding a shaped product (for example, Patent Document 1); and an inkjet method of jetting liquid ultraviolet-curable resins and applying ultraviolet ray to these resins, thereby curing the resins (for example, Patent Document 2). Besides these methods, stereolithography, a selective laser sintering method or powder sintering method, a powder plaster molding method, and the like have been known. In each of these shaping methods, three-dimensional shaping is performed by raw material discharged through a nozzle being deposited in a single direction (mainly, vertical direction) on a horizontal plane.

RELATED DOCUMENT

Patent Document

[Patent Document 1] JP Laid-open Patent Publication No. 2015-147414
[Patent Document 2] JP Laid-open Patent Publication No. 2005-059289

SUMMARY OF THE INVENTION

In a conventional three-dimensional shaping device using any of the three-dimensional shaping methods as the shaping method, in a case where a shaped product has a projecting portion, a support portion needs to be placed on a lower portion of the projecting portion so as to prevent the shape of the projecting portion from being distorted during molding. As the shape of the shaped product becomes more complicated, more support portions are needed. If the support portion is provided, an operation of removing the support portion is required after the shaping. In addition, another problem arises in that a surface of the projecting portion, after removal of the support portion, becomes rough. Furthermore, since the support portion is disposed of after the end of the molding, cost increase results, and also, such disposal is unfavorable to the environment.

An object of the present invention is to provide a three-dimensional shaping device with which a shaped product can be molded without providing any support portion or with a small number of support portions, a complicated shape can also be obtained through molding at high speed, and an even surface can be obtained through molding.

A three-dimensional shaping device according to the present invention is configured to repeatedly perform, while changing a relative position between a discharge head and a shaping table, an operation of discharging fluidic raw material through a nozzle of the discharge head and curing the raw material on the shaping table, thereby molding a shaped product in which the cured raw material is stacked in layers, the three-dimensional shaping device including: a linear motion mechanism configured to move the shaping table relative to the discharge head in three mutually orthogonal axial directions; and a rotation unit configured to tilt the shaping table relative to the discharge head.

In this configuration, the raw material is discharged through the nozzle of the discharge head, while the shaping table is being moved by the linear motion mechanism relative to the discharge head in the three mutually orthogonal axial directions and the shaping table is being rotated by the rotation unit relative to the discharge head. The discharged raw material is cured on the shaping table. The position and the angle of the shaping table relative to the discharge nozzle are adjusted, and the cured raw material is deposited in layers, thereby molding a shaped product having a predetermined shape.

Since the rotation unit is operable to rotate the shaping table relative to the discharge head with one or more degrees of rotational freedom, the shaped product can be molded not only by depositing the raw material on the horizontally provided shaping table but also by depositing the raw material on the tilted shaping table. For example, in a case where the shaped product has a projecting portion, the shaping table is tilted by the rotation unit such that a shaping surface, of the shaping table, on which the shaped product is to be molded, is orthogonal to the direction in which the projecting portion projects, whereby the raw material can be deposited in the direction of the projection. When the raw material is deposited in the direction of the projection, the shape of the projecting portion is unlikely to be distorted during the molding. Therefore, no support portion for supporting the projecting portion is needed, or the number of the support portions may be small. As a result, no operation of removing the support portion is needed, or the time period for the removal operation can be significantly shortened. In addition, it is possible to significantly overcome the problem that a surface of the projecting portion after removal of the support portion, becomes rough.

In addition, this configuration is different from that of a three-dimensional shaping device using a machine such as, a vertically articulated robot and a horizontally articulated robot for allowing high-speed operation in a wide range through combination of rotation mechanisms. Specifically, in this configuration, linear motion is performed by the linear motion mechanism and rotational motion is performed by the rotation unit, and thus, wasted movement in the operation of the entire three-dimensional shaping device is reduced, and smooth operation thereof is enabled. Accordingly, the three-dimensional shaping device has a compact configuration, the time period for the shaping can be shortened, and furthermore, the three-dimensional shaping device can be smoothly operated even when molding a shaped product having a complicated shape.

Moreover, the direction in which the shaping table is moved by the rotation unit, and the direction in which the discharge head is moved by the linear motion mechanism, are approximately the same as each other. Accordingly, the stroke of the linear motion mechanism can be shortened, whereby the dimension in the horizontal direction of the entire three-dimensional shaping device can be made small.

In the present invention, the rotation unit may have two degrees of rotational freedom. If the rotation unit has two degrees of rotational freedom, the shaping table can be tilted relative to the discharge head not only in a single direction but also in all directions around a circle. Accordingly, portions projecting in various directions around the circle can be molded, whereby a shaped product having a complicated shape can be molded.

The rotation unit may be a link actuation device having two degrees of rotational freedom. The link actuation device has a configuration in which: a distal-end-side link hub is coupled to a proximal-end-side link hub via three or more link mechanisms such that a posture of the distal-end-side link hub can be changed relative to a posture of the proximal-end-side link hub; each link mechanism includes proximal-side and distal-side end link members having one ends rotatably coupled respectively to the proximal-end-side link hub and the distal-end-side link hub, and an intermediate link member having opposed ends rotatably coupled respectively to other ends of the proximal-side and distal-side end link members; and posture-controlling actuators configured to arbitrarily change the posture of the distal-end-side link hub relative to the posture of the proximal-end-side link hub, are provided to two or more link mechanisms among the three or more link mechanisms. The shaping table is disposed on the distal-end-side link hub.

The link actuation device includes the proximal-end-side link hub; the distal-end-side link hub; and the three or more link mechanisms form a mechanism having two degrees of freedom, in which the distal-end-side link hub is rotatable relative to the proximal-end-side link hub about two mutually orthogonal axes. The mechanism having two degrees of freedom is compact but provides a wide range of possible movement of the distal-end-side link hub. In addition, the link actuation device is capable of smooth motion with no singularity in the range of possible movement.

If the above-described link actuation device is used as the rotation unit, the following advantages are obtained.

Since all the posture-controlling actuators can be disposed on the fixed side of the link actuation device, the weight of a movable portion including the shaping table is reduced, and thus, the posture of the shaping table can be changed at high speed.

Since the link actuation device can be configured to be compact, the three-dimensional shaping device also can be configured to be compact.

Since the link actuation device has a wide range of possible movement, the raw material can be deposited from various angles with respect to the shaping table. Specifically, in a case where an imaginary sphere of which the center is located on the shaping surface of the shaping table is assumed, the raw material can be deposited on the shaping table by discharging the raw material from all directions around a hemisphere on the shaping surface side of the imaginary sphere.

Since the link actuation device is capable of smooth motion in various directions, a shaped product having a complicated shape can also be molded evenly.

In the present invention, a position and a posture of the discharge head may be fixed, the shaping table may be disposed on the rotation unit such that a shaping surface, on which the shaped product is to be molded, faces upward, and the rotation unit may be mounted to the linear motion mechanism. If the position and the posture of the discharge head are fixed, a tube through which the raw material is supplied can be fixed, whereby the raw material can be stably discharged through the nozzle of the discharge head. In addition, if the shaping surface faces upward, the raw material can be easily deposited on the shaping table.

The link actuation device serving as the rotation unit may be disposed such that the distal-end-side link hub is located below the proximal-end-side link hub, the shaping table may be disposed in an inner space within the three or more link mechanisms, and a part of or the entirety of the discharge head may be inserted in the inner space through a through hole formed in the proximal-end-side link hub. In this configuration, the range in which the discharge head and the shaping table can be moved relative to each other is small, and thus, only a relatively small shaped product can be molded. However, since the stroke in each axial direction of the linear motion mechanism becomes small, the entire three-dimensional shaping device becomes compact, resulting in reduction in cost.

The three-dimensional shaping device according to the present invention may be of a type of molding a shaped product through a fused deposition modeling method. The fused deposition modeling method is a method for molding a shaped product by stacking layers of thermally fusible resin one by one. Therefore, the shaping table does not need to be immersed in a liquid agent or the like, and the raw material can be deposited in various directions while the resin is being cured. Therefore, among various shaping methods, the fused deposition modeling method is suitable for use in the three-dimensional shaping device according to the present invention.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Embodiments of the present invention will be described with reference to the drawings.

First Embodiment

Figure 1:
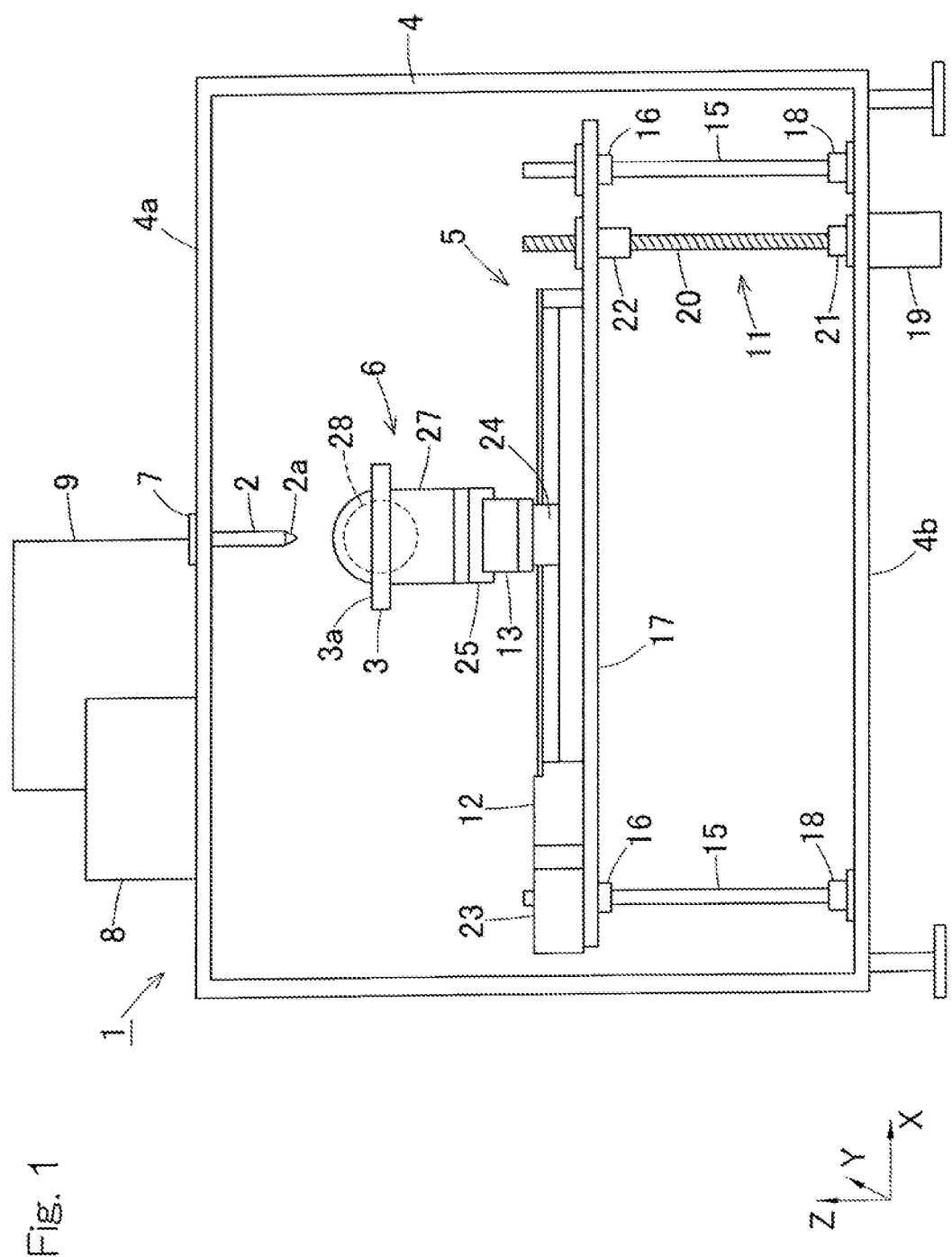
FIG. 1 is a front view showing a schematic configuration of a three-dimensional shaping device according to a first embodiment of the present invention.

FIG. 1 is a front view showing a schematic configuration of a three-dimensional shaping device according to a first embodiment of the present invention. The three-dimensional shaping device 1 is a device for molding a shaped product through a fused deposition modeling method, in which raw material melted by heat so as to be fluidic is discharged through a nozzle 2a of a discharge head 2 and is cured on a shaping table 3. This operation is repeated while the relative position between the discharge head 2 and the shaping table 3 is being changed, thereby molding a shaped product in which the cured raw material is stacked in layers. As the raw material, for example, a resin having a property of being melted by heat is used.

The three-dimensional shaping device 1 includes a box-like mount 4 having a rectangular front shape with legs. On a lower portion of the mount 4, a linear motion mechanism 5 movable in three mutually orthogonal axial directions is disposed. The linear motion mechanism 5 is equipped with a rotation unit 6 having one degree of rotational freedom. The shaping table 3 is provided to the rotation unit 6.

The discharge head 2 is fixed to an upper surface portion 4a of the mount 4 via a head-fixing member 7. The discharge head 2 is fixed to the upper surface portion 4a by means of a bolt or the like, and can be detached upward from the upper surface portion 4a. A raw material tank 8 containing raw material, which is modeling material for a shaped product, is disposed on the upper surface of the upper surface portion 4a of the mount 4. The raw material tank 8 and the discharge head 2 are connected to each other via a raw material supply tube 9. The raw material supply tube 9 is a tube through which the raw material in the raw material tank 8 is supplied to the discharge head 2. The raw material tank 8 may be disposed inside the mount 4 or may be disposed separately from the three-dimensional shaping device 1.

The linear motion mechanism 5 includes: a Z-axis linear motion portion 11 movable in an up/down direction or vertical direction (Z-axis direction); an X-axis linear motion portion 12 movable in a left/right direction (X-axis direction); and a Y-axis linear motion portion 13 movable in the front/rear direction (Y-axis direction). The linear motion portions 11, 12, and 13 are linked to each other, and unitized into the linear motion mechanism 5.

The Z-axis linear motion portion 11 has a configuration using a ball screw mechanism. Specifically, a Z-axis stage 17 is guided, so as to be capable of being lifted or lowered, via linear bushes 16 by a plurality of shafts 15 extending upward from a bottom surface portion 4b of the mount 4. The shafts 15 are supported on the bottom surface portion 4b of the mount 4 by respective shaft support members 18. The Z-axis stage 17 has the shape of a flat plate that is elongated in the left/right direction. A motor 19 is mounted to the bottom surface portion 4b of the mount 4, and a screw shaft 20 rotated by the motor 19 extends upward from the motor 19 so as to be parallel to the shafts 15. The screw shaft 20 is rotatably supported by a bearing unit 21. A nut 22 provided to the Z-axis stage 17 is screwed onto the screw shaft 20. In this configuration, by the screw shaft 20 being rotated by the motor 19, the Z-axis stage 17 is lifted or lowered while being guided by the shafts 15.

The X-axis linear motion portion 12 is implemented by a linear motion actuator disposed on the Z-axis stage 17, and an X-axis stage 24 advances or retreats in the left/right direction (X-axis direction) when being driven by a motor 23. The Y-axis linear motion portion 13 is implemented by a linear motion actuator disposed on the X-axis stage 24, and a Y-axis stage 25 advances or retreats in the front/rear direction (Y-axis direction) when being driven by a motor (not shown). The Y-axis stage 25 forms an output portion of the linear motion mechanism 5. The rotation unit 6 is disposed on the Y-axis stage 25.

Figure 2A:
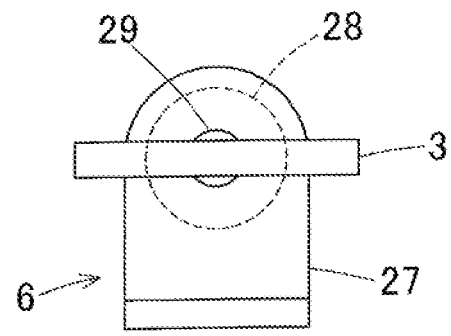
FIG. 2A is a front view of a rotation unit of the three-dimensional shaping device.
Figure 2B:
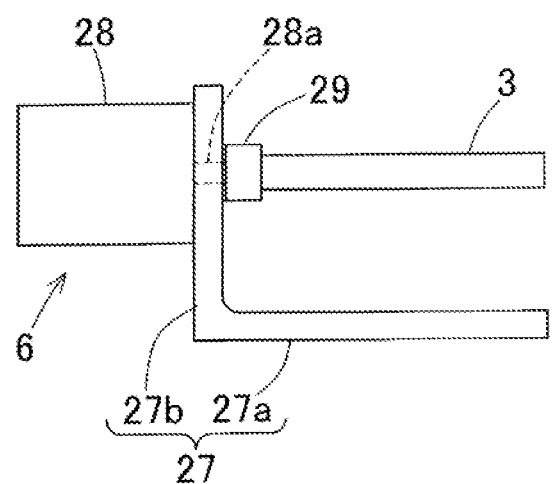
FIG. 2B is a side view of the rotation unit of the three-dimensional shaping device.

FIG. 2A and FIG. 2B are a front view and a side view of the rotation unit 6. In the rotation unit 6, a motor-fixing member 27 is fixed to the Y-axis stage 25 (FIG. 1), and a motor 28 is mounted to the motor-fixing member 27. The motor-fixing member 27 has an L-shape in a lateral view, one side 27a of the L-shape is fixed to the Y-axis stage 25 (FIG. 1), and the motor 28 is mounted to another side 27b. An output shaft 28a of the motor 28 extends in the front/rear direction, and the shaping table 3 is mounted to the output shaft 28a via a coupling member 29.

Operations of the three-dimensional shaping device 1 will be described. In the three-dimensional shaping device 1, the raw material is discharged through the nozzle 2a of the discharge head 2, while the shaping table 3 is being moved relative to the discharge head 2 by the linear motion mechanism 5 in the three mutually orthogonal axial directions and the shaping table 3 is being rotated relative to the discharge head 2 by the rotation unit 6. The discharged raw material is cured on the shaping table 3, and the cured raw material is deposited in layers, thereby molding a shaped product. The linear motion mechanism 5, the rotation unit 6, and the discharge head 2 are controlled by a control device (not shown) so as to be operated in a coordinated manner.

Figure 3A:
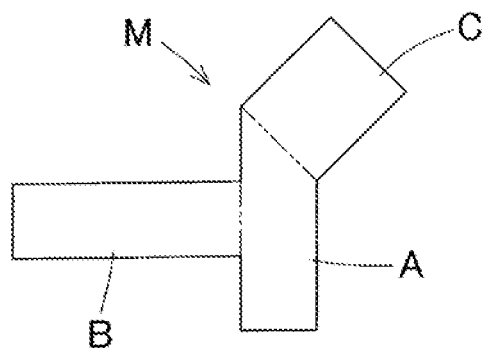
FIG. 3A is a view showing an example of a shaped product.

A shaping method will be specifically described by using, as an example, the case of molding a shaped product M having a shape shown in FIG. 3A. The thickness in the depth direction of the shaped product M is made even.

Figure 4:
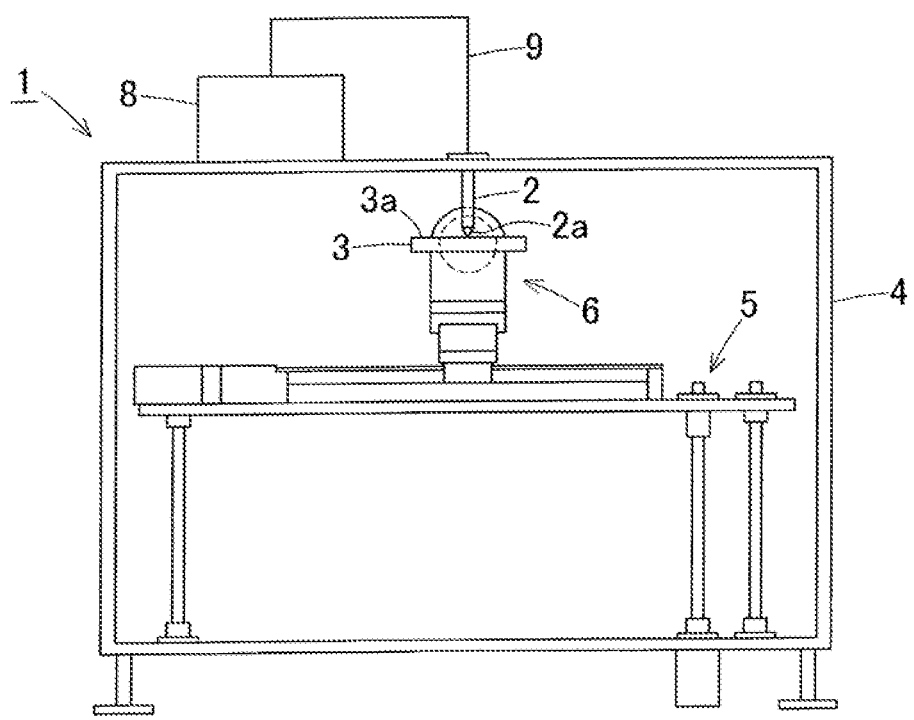
FIG. 4 is an explanatory view indicating procedural step 1 of a shaping method that is performed by using the three-dimensional shaping device in FIG. 1.
Figure 5:
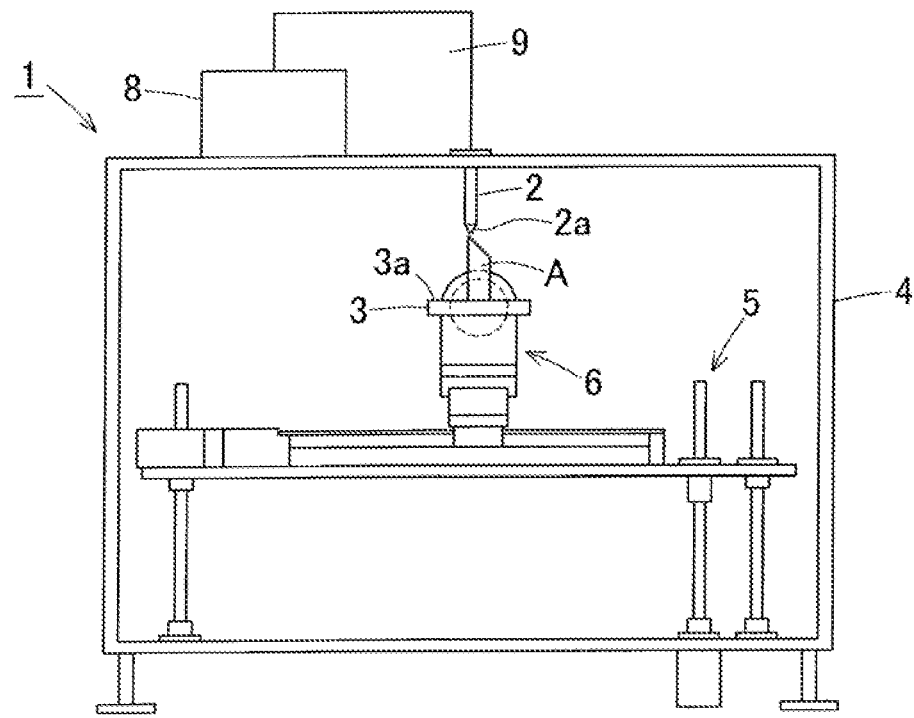
FIG. 5 is an explanatory view indicating procedural step 2 of the shaping method.

First, as in step 1 shown in FIG. 4, the shaping table 3 is made horizontal, and the position of the shaping table 3 is adjusted by the linear motion mechanism 5 such that a shaping surface 3a of the shaping table 3 is located directly below the nozzle 2a of the discharge head 2. The shaping surface 3a refers to a surface on which a shaped product is to be molded, and is, in this example, the upper surface. The raw material is discharged through the nozzle 2a while the shaping table 3 is being moved in the front/rear direction and in the left/right direction correspondingly to the shape of the target shaped product. This operation is repeated while the shaping table 3 is being gradually lowered, whereby the raw material is deposited in the shape of a portion A (see FIG. 3A) of the shaped product M on the shaping table 3, as in step 2 shown in FIG. 5. The position and the posture of the discharge head 2 are fixed, and the raw material supply tube 9 is fixed, whereby the raw material can be stably discharged through the nozzle 2a of the discharge head 2.

Figure 6:
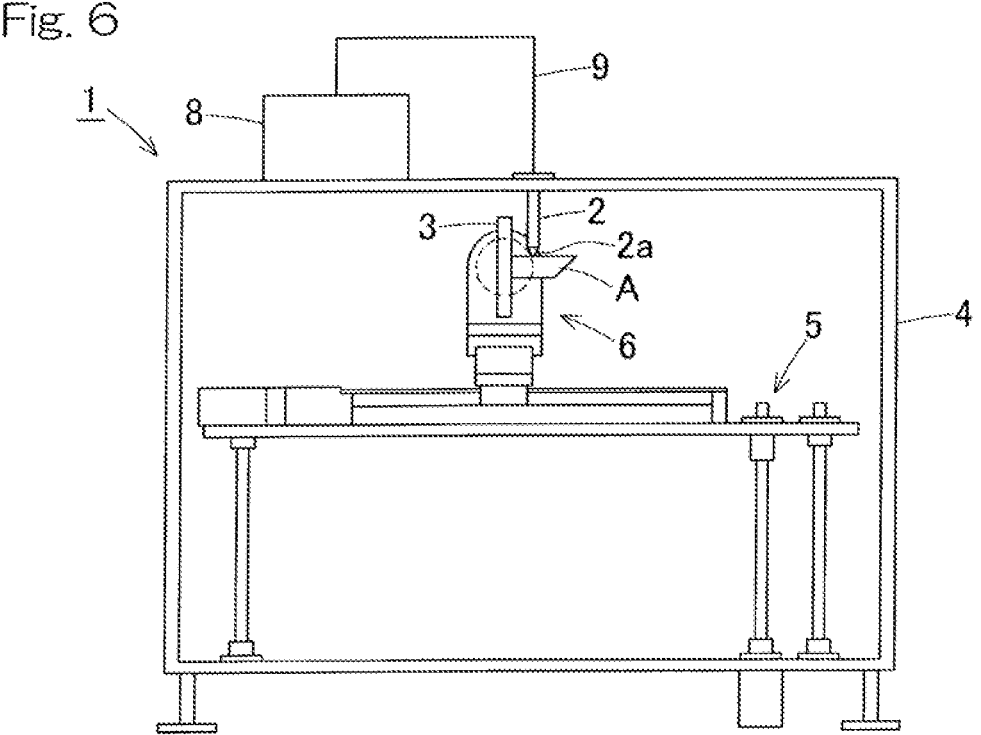
FIG. 6 is an explanatory view indicating procedural step 3 of the shaping method.
Figure 7:
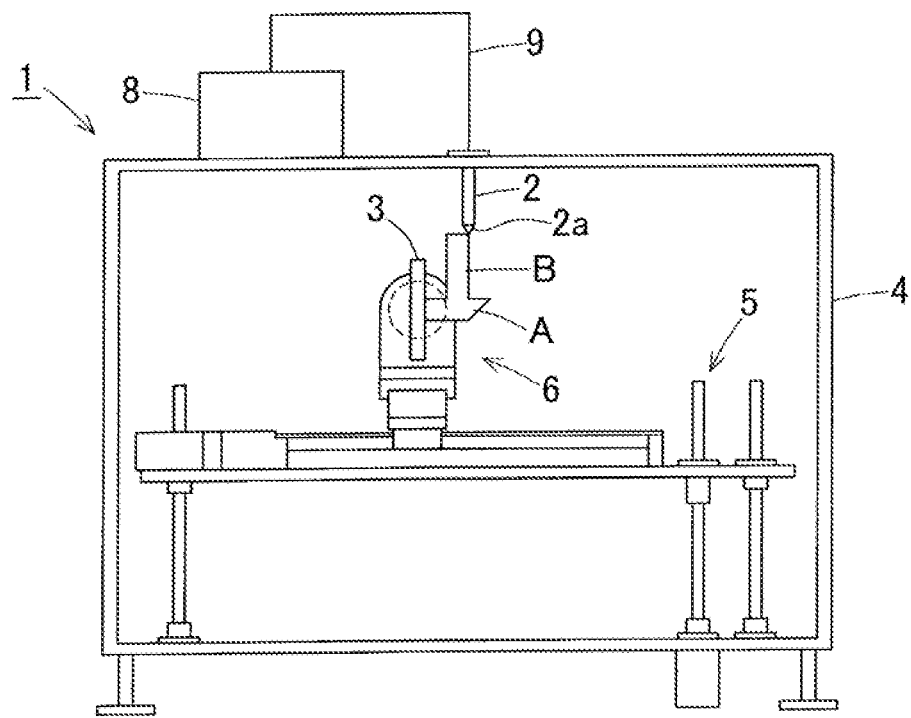
FIG. 7 is an explanatory view indicating procedural step 4 of the shaping method.

The raw material is cured and then, as in step 3 shown in FIG. 6, the shaping table 3 is rotated clockwise by 90° and the shaping table 3 is positioned in the vertical direction. Then, similarly to the above, the raw material is discharged through the nozzle 2a while the shaping table 3 is being horizontally moved and lowered, thereby molding a portion B (see FIG. 3A) of the shaped product M, as in step 4 shown in FIG. 7.

Figure 8:
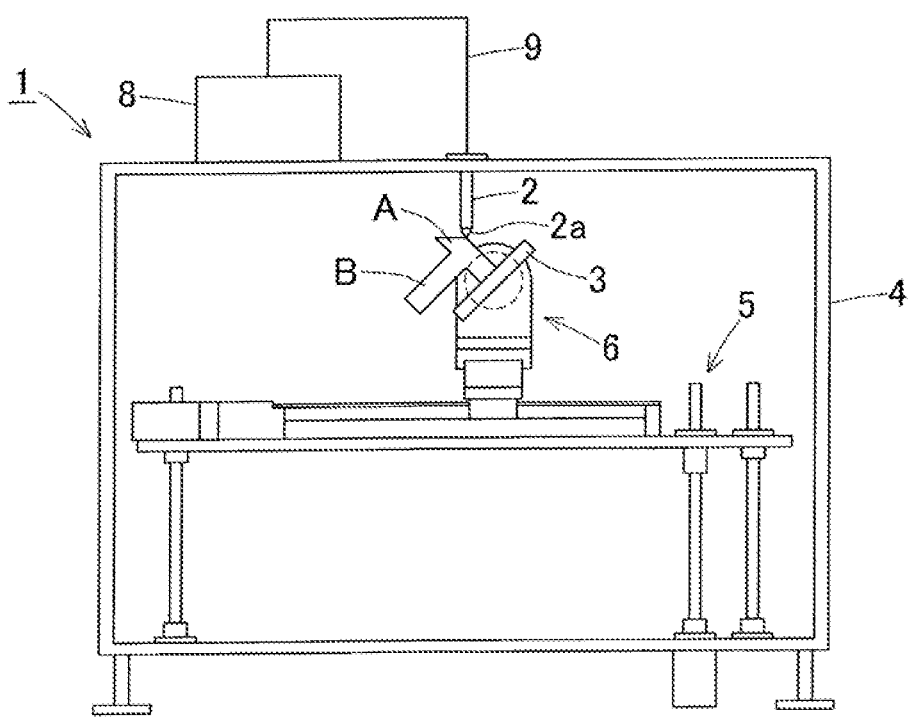
FIG. 8 is an explanatory view indicating procedural step 5 of the shaping method.
Figure 9:
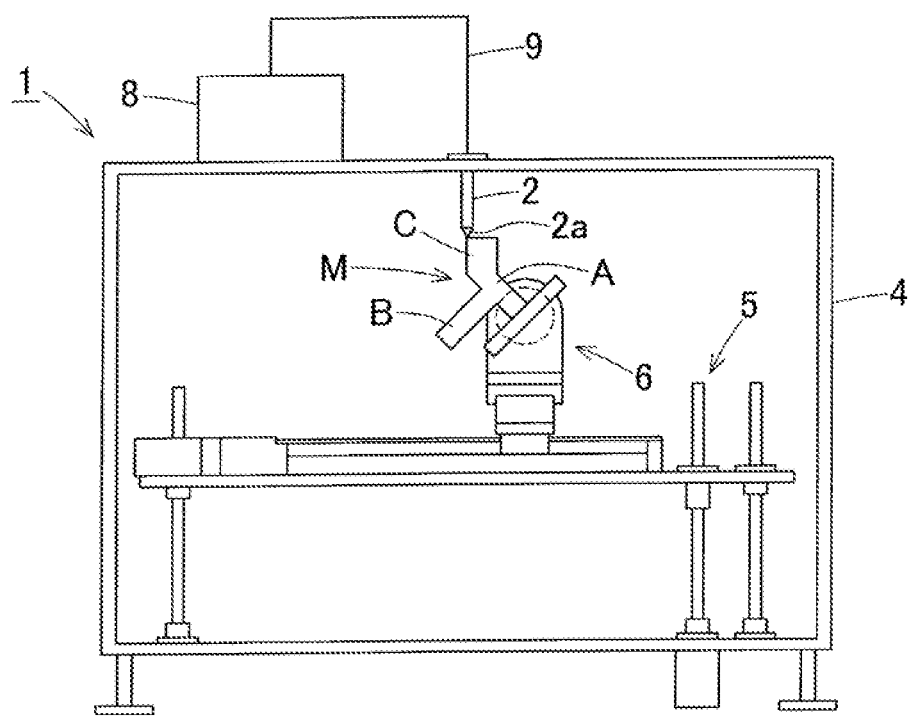
FIG. 9 is an explanatory view indicating procedural step 6 of the shaping method.

The raw material is cured and then, as in step 5 shown in FIG. 8, the shaping table 3 is rotated counterclockwise by 135° to have such a posture as to be sloped at 45° and the shaping table 3 is positioned in the vertical direction. Then, similarly to the above, the raw material is discharged through the nozzle 2a while the shaping table 3 is being horizontally moved and lowered, thereby molding a portion C (see FIG. 3A) of the shaped product M, as in step 6 shown in FIG. 9. In this manner, the shaped product M shown in FIG. 3A is molded.

The shaped product is molded through the fused deposition modeling method as described above. Since the fused deposition modeling method is a method for molding a product by stacking layers of thermally fusible resin one by one, the shaping table 3 does not need to be immersed in a liquid agent or the like, whereby the raw material can be deposited in various directions while the resin is being cured. Therefore, among various shaping methods, the fused deposition modeling method is suitable for use in the three-dimensional shaping device.

Since the three-dimensional shaping device 1 includes the rotation unit 6 for rotating the shaping table 3 relative to the discharge head 2, the shaped product can be molded not only by depositing the raw material on a horizontal plane, but also by depositing the raw material on a tilted plane. Therefore, in a case where the shaped product M has projecting portions (portion B and portion C) as in FIG. 3A, a plane orthogonal to the direction in which each projecting portion projects is created, and the shaping table 3 is tilted by the rotation unit 6 so that the raw material can be stacked on the created plane in the direction of the projection.

Figure 3B:
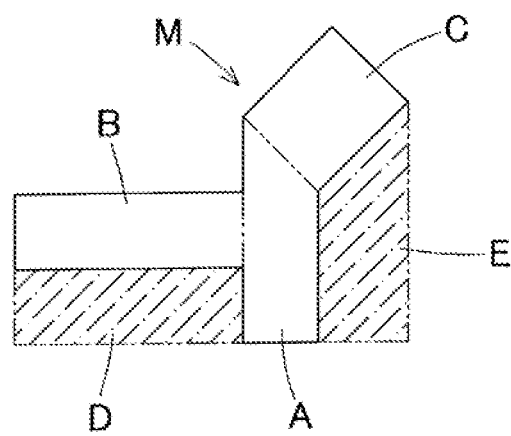
FIG. 3B is a view showing an object that is in the middle of being molded into the shaped product through a conventional shaping method.

In a case where the shaped product M shown in FIG. 3A is molded by using a conventional device, the shaped product M needs to be molded in a state where support portions (portion D and portion E) are provided on lower portions of the projecting portions as shown in FIG. 3B, such that the shapes of the projecting portions (portion B and portion C) are not distorted during shaping. The support portions are removed at a later stage. On the other hand, in a case where the three-dimensional shaping device 1 according to the present invention is used, since the raw material is deposited in the direction of the projection, the shape is unlikely to be distorted during shaping. Therefore, no support portion is needed, or the number of the support portions may be small. As a result, no operation of removing the support portions is needed, or the time period for the removal operation can be significantly shortened. In addition, it is possible to significantly overcome the problem that surfaces of the projecting portions after removal of the support portions, become rough.

In addition, this configuration is different from that of a three-dimensional shaping device using a mechanism for allowing high-speed operation in a wide range through combination of rotation mechanisms, as do a vertically articulated robot and a horizontally articulated robot. Specifically, in this configuration, linear motion is performed by the linear motion mechanism 5 and rotational motion is performed by the rotation unit 6, and thus, wasted movement in the operation of the entire three-dimensional shaping device 1 is reduced, and smooth operation thereof is enabled. Accordingly, the three-dimensional shaping device 1 has a compact configuration, the time period for the shaping can be shortened, and furthermore, the three-dimensional shaping device 1 can be smoothly operated even when molding a shaped product having a complicated shape.

Moreover, the direction in which the shaping table 3 is moved by the rotation unit 6 and the direction in which the rotation unit 6 is moved by the linear motion mechanism 5, are approximately the same as each other. Accordingly, the strokes of the X-axis linear motion portion 12 and the Y-axis linear motion portion 13 of the linear motion mechanism 5 can be shortened. Consequently, the dimension in the horizontal direction of the entire three-dimensional shaping device 1 can be made small.

Second Embodiment

Figure 10:
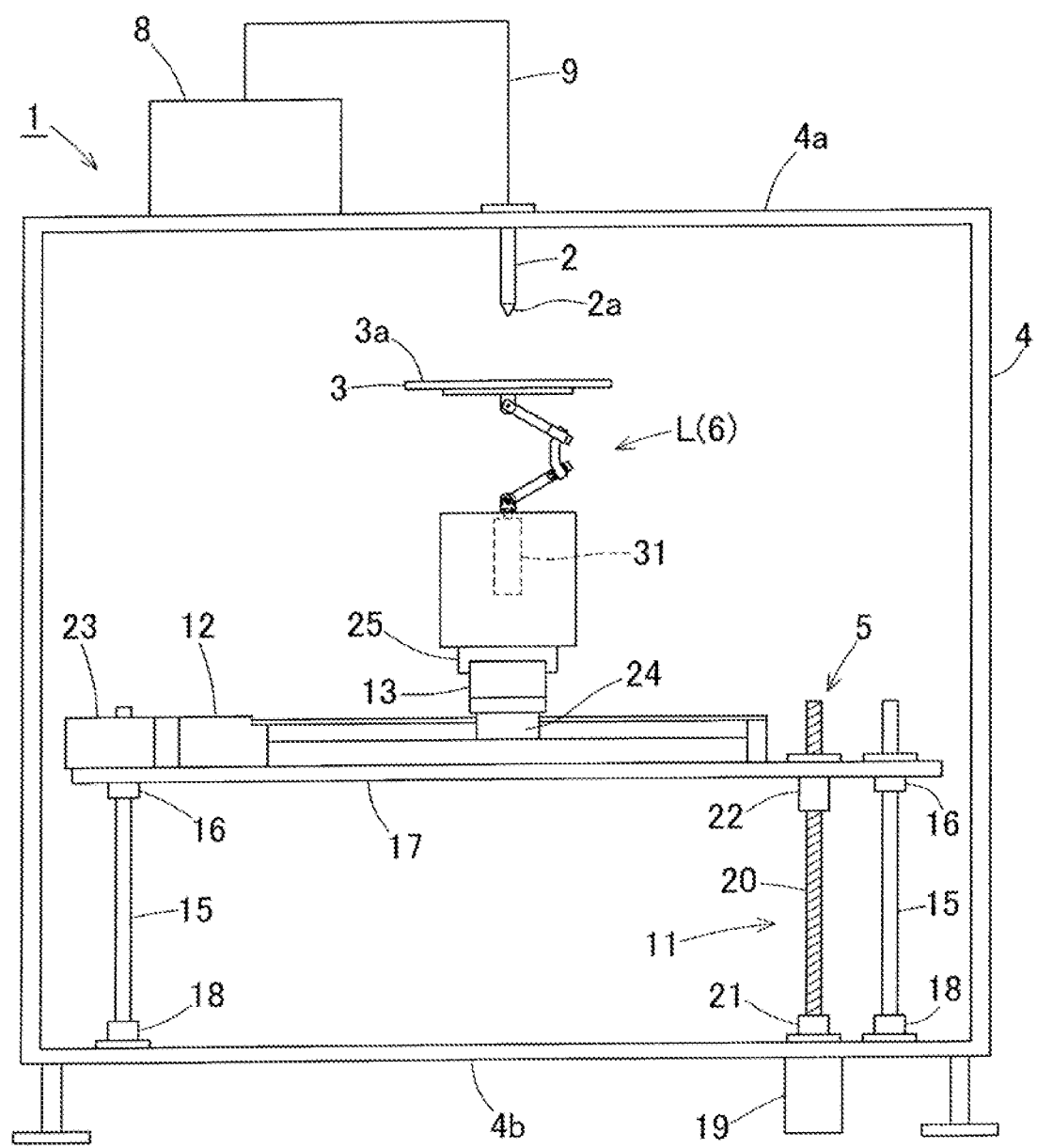
FIG. 10 is a front view showing a schematic configuration of a three-dimensional shaping device according to a second embodiment of the present invention.
Figure 10:
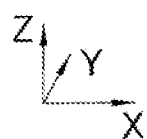

FIG. 10 is a front view showing a schematic configuration of a three-dimensional shaping device according to a second embodiment of the present invention. In the three-dimensional shaping device 1, the rotation unit 6 is implemented by a link actuation device L having two degrees of rotational freedom. The other components are the same as those in the first embodiment. The same components as those in the first embodiment described above are denoted by the same reference numerals, and the description thereof is omitted.

Figure 11:
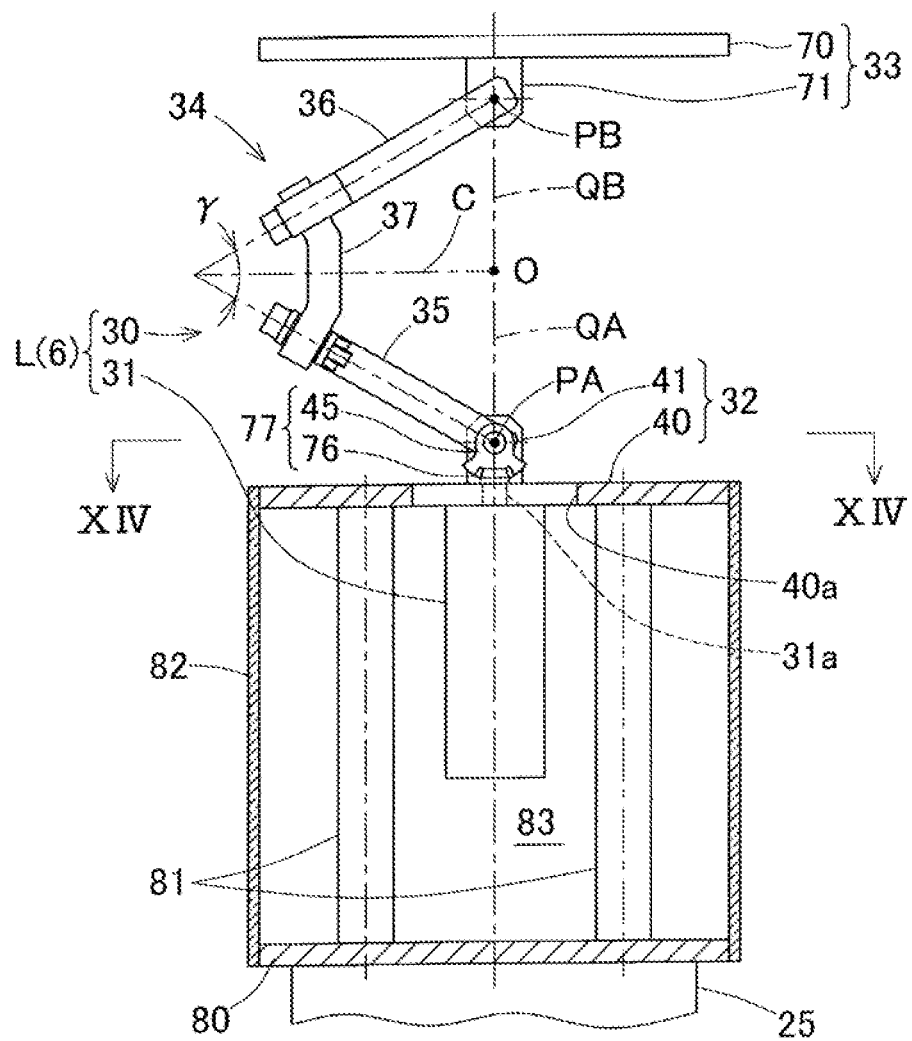
FIG. 11 is a front view indicating, in a cross section, a part of a link actuation device serving as the rotation unit of the three-dimensional shaping device.
Figure 12:
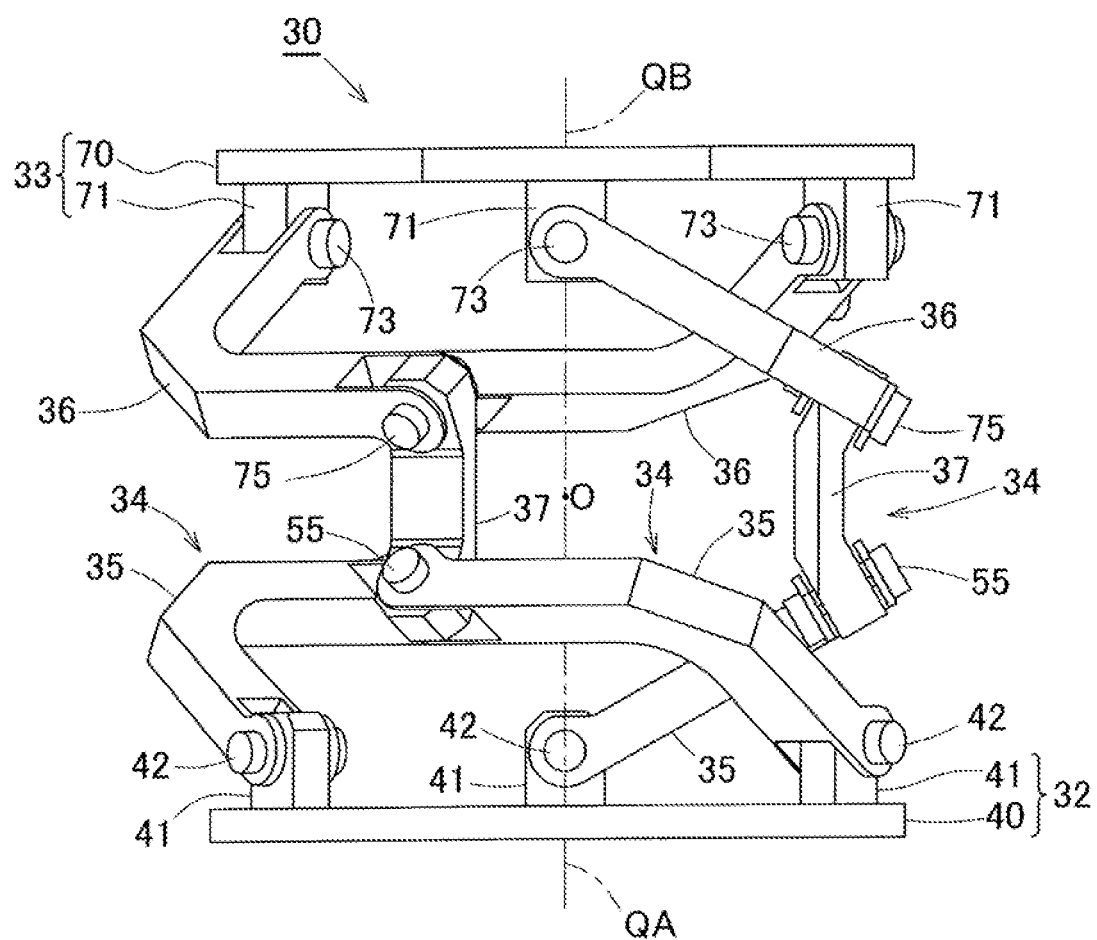
FIG. 12 is a view showing a parallel link mechanism, in one state, of the link actuation device.
Figure 13:
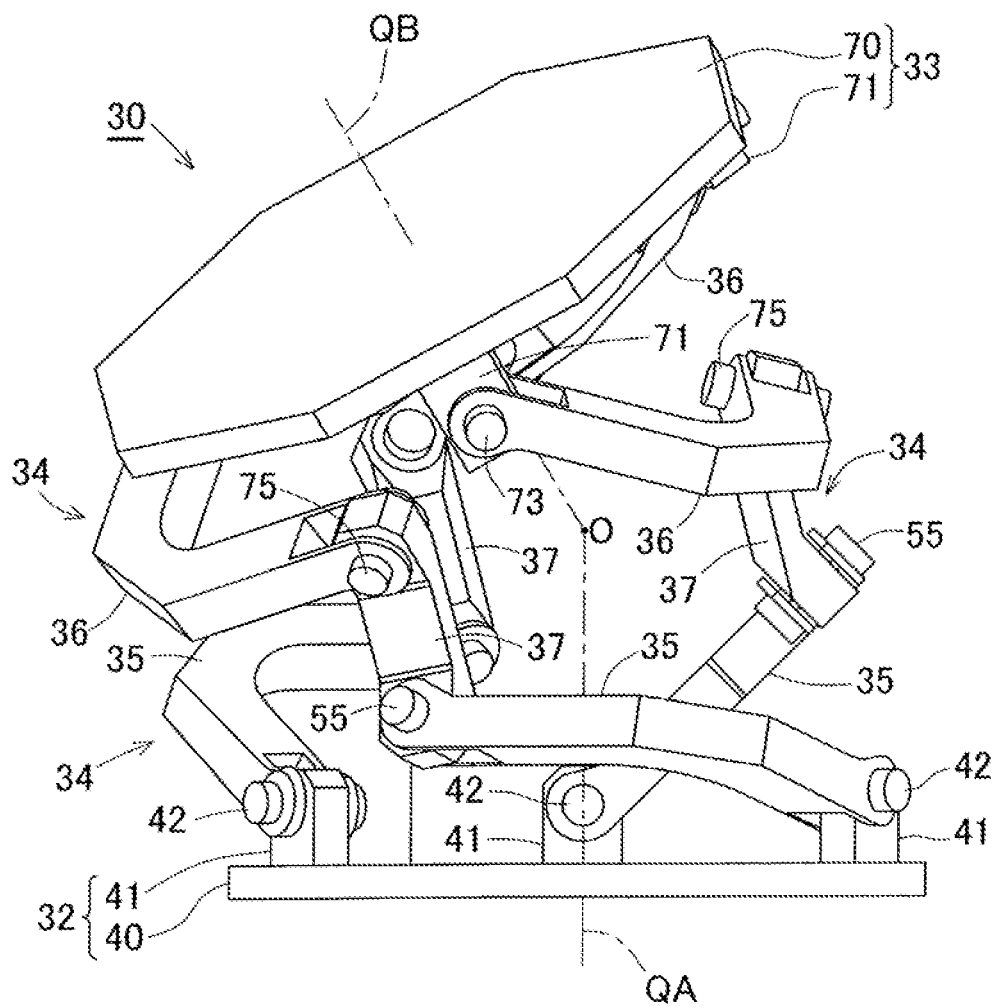
FIG. 13 is a view showing the parallel link mechanism in another state.

As shown in FIG. 11, the link actuation device L includes a parallel link mechanism 30 and a plurality of posture-controlling actuators 31 for actuating the parallel link mechanism 30. FIG. 12 and FIG. 13 are perspective views selectively showing only the parallel link mechanism 30, and the state of the parallel link mechanism 30 is different between FIG. 12 and FIG. 13. As shown in FIG. 11 to FIG.

13, in the parallel link mechanism 30, a distal-end-side link hub 33 is coupled to a proximal-end-side link hub 32 via three link mechanisms 34 such that the posture of the distal-end-side link hub 33 can be changed relative to the posture of the proximal-end-side link hub 32. FIG. 11 shows only one of the link mechanisms 34. The number of the link mechanisms 34 may be four or more.

Each link mechanism 34 includes a proximal-side end link member 35, a distal-side end link member 36 and an intermediate link member 37, so as to form a quadric chain link mechanism composed of four revolute pairs. The proximal-side and distal-side end link members 35 and 36 are L-shaped. The proximal-side end link members 35 has one end rotatably coupled to the proximal-end-side link hub 32, and the distal-side end link members 36 has one end rotatably coupled to the distal-end-side link hub 33. The intermediate link member 37 has opposed ends to which the other ends of the proximal-side and distal-side end link members 35 and 36 are rotatably coupled, respectively.

The parallel link mechanism 30 is formed by combining two spherical link mechanisms, in which the central axes of the revolute pairs between the link hubs 32 and 33 and the end link members 35 and 36, and the central axes of the revolute pairs between the end link members 35 and 36 and the intermediate link members 37, intersect with one another at spherical link centers PA and PB (FIG. 11) respectively on the proximal end side and the distal end side. In addition, on the proximal end side and the distal end side, the distances from the spherical link centers PA and PB to the revolute pairs between the link hubs 32 and 33 and the end link members 35 and 36 are equal to one another, and the distances from the spherical link centers PA and PB to the revolute pairs between the end link members 35 and 36 and the intermediate link members 37 are also equal to one another. The central axes of the revolute pairs between the end link member 35 and 36 and the intermediate link member 37 may form a certain intersection angle γ (FIG. 11) or may be parallel to each other.

Figure 14:
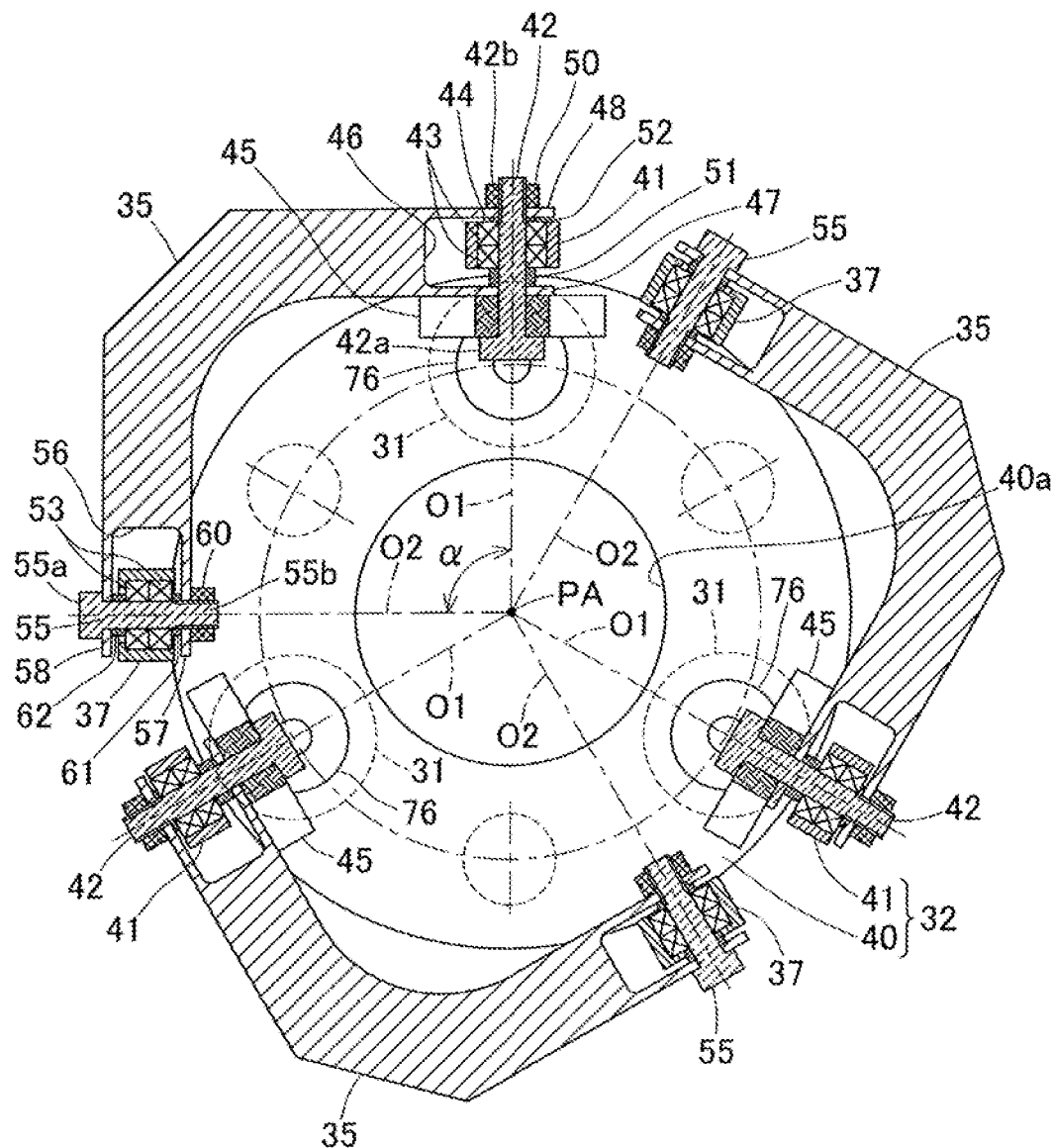
FIG. 14 is a cross-sectional view taken along the line XIV-XIV in FIG. 11.

FIG. 14 is a cross-sectional view taken along the line XIV-XIV in FIG. 11. FIG. 14 shows a relationship between: the central axes O1 of the revolute pairs between the proximal-end-side link hub 32 and the proximal-side end link members 35; the central axes O2 of the revolute pairs between the intermediate link members 37 and the proximal-side end link members 35; and the proximal-end-side spherical link center PA. Specifically, the point at which the central axes O1 and the central axes O2 intersect with one another, is the spherical link center PA. The positional relationship and the shapes of the distal-end-side link hub 33 and the distal-side end link members 36 are the same as those in FIG. 14 (not shown). In the example in FIG. 14, the angle α formed by the central axis O1 of each revolute pair between the link hub 32(33) and the end link member 35(36) and the central axis O2 of each revolute pair between the end link member 35(36) and the intermediate link member 37, is set at 90°. However, the angle α may be an angle other than 90°.

Figure 15:
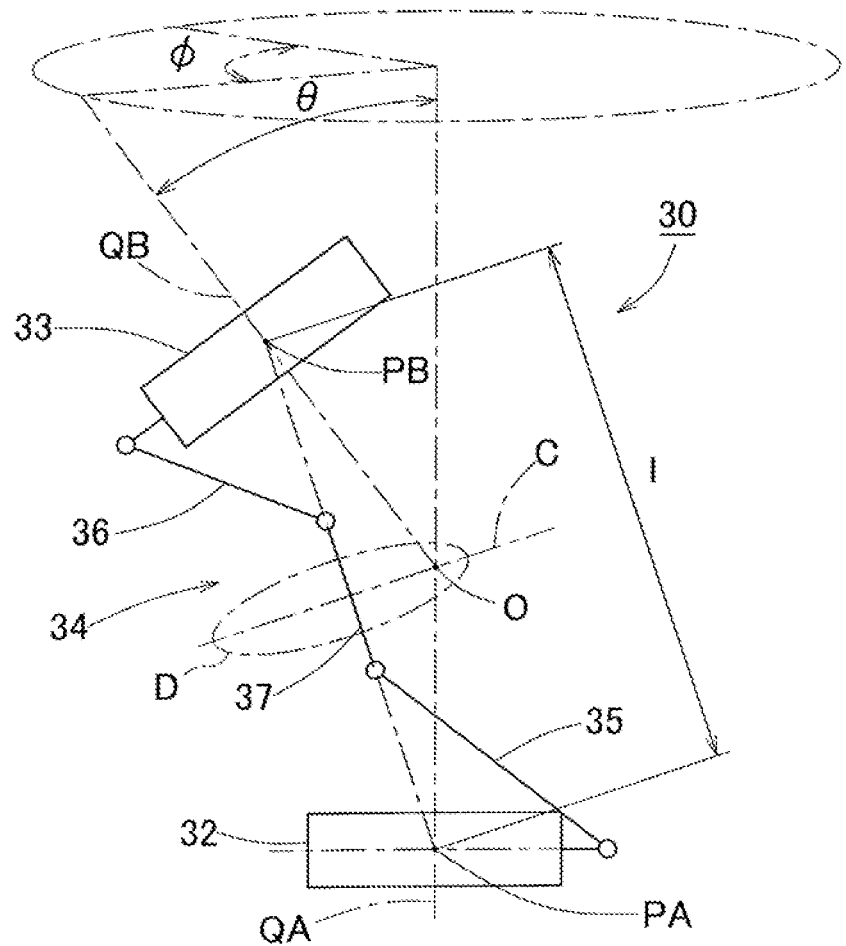
FIG. 15 is a view in which one of link mechanisms of the link actuation device is depicted with straight lines.

The three link mechanisms 34 have a geometrically identical configuration. The geometrically identical configuration means that, as shown in FIG. 15, a geometric model depicted with straight lines representing the link members 35, 36, and 37, that is, a model depicted with the revolute pairs and straight lines connecting these revolute pairs, represents a shape in which a proximal-end-side portion thereof and a distal-end-side portion thereof are symmetric with each other about a center portion of the intermediate link member 37. FIG. 15 is a view in which one of the link mechanisms 34 is depicted with straight lines. The parallel link mechanism 30 in the second embodiment is of a rotation symmetrical type, that is, has a positional configuration in which a positional relationship is established such that a proximal side region composed of the proximal-end-side link hub 32 and the proximal-side end link member 35 are rotationally symmetric, about a center line C of the intermediate link member 37, with a distal side region composed of the distal-end-side link hub 33 and the distal-side end link member 36. The center portion of each intermediate link member 37 is located on a common orbital circle D.

The proximal-end-side link hub 32, the distal-end-side link hub 33, and the three link mechanisms 34 cooperate together to form a mechanism having two degrees of freedom, in which the distal-end-side link hub 33 is rotatable relative to the proximal-end-side link hub 32 about two mutually orthogonal axes. In other words, the mechanism allows the distal-end-side link hub 33 to rotate with two degrees of freedom to change the posture thereof, relative to the proximal-end-side link hub 32. The mechanism having two degrees of freedom is compact but provides a wide range of possible movement of the distal-end-side link hub 33 relative to the proximal-end-side link hub 32.

For example, straight lines that pass the spherical link centers PA and PB and that intersect, at right angles, with the central axes O1 (FIG. 14) of the respective revolute pairs between the link hubs 32 and 33. In this case, the end link members 35 and 36 are defined as central axes QA and QB of the link hubs 32 and 33, the maximum value of a bend angle θ (FIG. 15) between the central axis QA of the proximal-end-side link hub 32 and the central axis QB of the distal-end-side link hub 33, can be set to about ±90°. In addition, an angle of traverse φ (FIG. 15) of the distal-end-side link hub 33 relative to the proximal-end-side link hub 32 can be set within the range of 0° to 360°. The bend angle θ refers to a vertical angle formed when the central axis QB of the distal-end-side link hub 33 is tilted relative to the central axis QA of the proximal-end-side link hub 32. The angle of traverse φ refers to a horizontal angle formed when the central axis QB of the distal-end-side link hub 33 is tilted relative to the central axis QA of the proximal-end-side link hub 32.

The posture of the distal-end-side link hub 33 relative to the proximal-end-side link hub 32 is changed with, as a rotation center, an intersection point O of the central axis QA of the proximal-end-side link hub 32 and the central axis QB of the distal-end-side link hub 33. FIG. 12 shows a state where the central axis QA of the proximal-end-side link hub 32 and the central axis QB of the distal-end-side link hub 33 are on the same line, and FIG. 13 shows a state where the central axis QB of the distal-end-side link hub 33 forms a certain operating angle relative to the central axis QA of the proximal-end-side link hub 32. Even when the posture is changed, a distance I (FIG. 15) between the proximal-end-side and distal-end-side spherical link centers PA and PB does not change.

If the link mechanisms 34 satisfy the following conditions 1 to 5, the proximal side region composed of the proximal-end-side link hub 32 and the proximal-side end link member 35, and the distal side region composed of the distal-end-side link hub 33 and the distal-side end link member 36, move in the same manner owing to geometrical symmetry. Therefore, the parallel link mechanism 30 functions as a constant velocity universal joint in which the proximal side region and the distal side region are rotated by the same rotation angle at an equal speed when transmitting rotation from the proximal end side to the distal end side.

Condition 1: The angles and the lengths of the central axes O1 of the revolute pairs between the link hubs 32 and 33 and the end link members 35 and 36 in the respective link mechanisms 34 are equal to one another.

Condition 2: The central axes O1 of the revolute pairs between the link hubs 32 and 33 and the end link members 35 and 36, and the central axes O2 of the revolute pairs between the end link members 35 and 36 and the intermediate link members 37, intersect with one another at the spherical link centers PA and PB on the proximal end side and the distal end side.

Condition 3: The geometrical shapes of the proximal-side end link member 35 and the distal-side end link member 36 are the same.

Condition 4: The geometrical shapes of a proximal-end-side portion and a distal-end-side portion of the intermediate link member 37 are the same.

Condition 5: The angular positional relationships between the intermediate link member 37 and the end link members 35 and 36 with respect to a symmetry plane of the intermediate link member 37, are the same between the proximal end side and the distal end side.

As shown in FIG. 11 to FIG. 13, the proximal-end-side link hub 32 includes a proximal end member 40 and three rotation shaft coupling members 41 provided integrally with the proximal end member 40. As shown in FIG. 14, the proximal end member 40 has a circular through hole 40a at a center portion thereof, and the three rotation shaft coupling members 41 are arranged around the through hole 40a at equal intervals in the circumferential direction. The center of the through hole 40a is located on the central axis QA (FIG. 11) of the proximal-end-side link hub 32. To each rotation shaft coupling member 41, a rotation shaft 42 is rotatably coupled such that the axis thereof intersects with the central axis QA of the proximal-end-side link hub 32. One end of the corresponding proximal-side end link member 35 is coupled to the rotation shaft 42.

As shown in FIG. 14, the rotation shaft 42 is rotatably supported by the rotation shaft coupling member 41 via two bearings 43. The bearings 43 are each a ball bearing such as a deep groove ball bearing or an angular contact ball bearing, for example. These bearings 43 are disposed, in a fitted manner, in an inner-diameter hole 44 formed in the rotation shaft coupling member 41, and are fixed by a method such as press fit, adhesion, or crimping. The same applies to the types of, and the mounting method for, bearings that are provided to the other revolute pair portions.

The one end of the proximal-side end link member 35 and a fan-shaped bevel gear 45 (described later) are coupled to the rotation shaft 42 so as to be rotated integrally with the rotation shaft 42. Specifically, a cut portion 46 is formed at the one end of the proximal-side end link member 35, and the rotation shaft coupling member 41 is disposed between inner and outer rotation shaft support portions 47 and 48 which form opposed side portions of the cut portion 46. The bevel gear 45 is disposed so as to be in contact with the inner surface of the inner rotation shaft support portion 47. The rotation shaft 42 is inserted from the inner side into a through hole formed in the bevel gear 45, a through hole formed in the inner rotation shaft support portion 47, hollows of inner rings of the bearings 43, and a through hole formed in the outer rotation shaft support portion 48 in this order. Then, the bevel gear 45, the inner and outer rotation shaft support portions 47 and 48, and the inner rings of the bearings 43 are sandwiched between a head portion 42a of the rotation shaft 42 and a nut 50 screwed onto a thread portion 42b of the rotation shaft 42, so as to be connected to each other. Spacers 51 and 52 are interposed between the bearings 43 and the inner and outer rotation shaft support portions 47 and 48 so as to apply preload to the bearings 43 when the nut 50 is screwed.

A rotation shaft 55 is connected to the other end of the proximal-side end link member 35. The rotation shaft 55 is rotatably coupled to one end of the corresponding intermediate link member 37 via two bearings 53. Specifically, a cut portion 56 is formed at the other end of the proximal-side end link member 35, and the one end of the intermediate link member 37 is disposed between inner and outer rotation shaft support portions 57 and 58 which form opposed side portions of the cut portion 56. The rotation shaft 55 is inserted from the outer side into a through hole formed in the outer rotation shaft support portion 58, hollows of inner rings of the bearings 53, and a through hole formed in the inner rotation shaft support portion 57 in this order. The inner and outer rotation shaft support portions 57 and 58, and the inner rings of the bearings 53 are sandwiched between a head portion 55a of the rotation shaft 55 and a nut 60 screwed onto a thread portion 55b of the rotation shaft 55, so as to be connected to each other. Spacers 61 and 62 are interposed between the bearings 53 and the inner and outer rotation shaft support portions 57 and 58 so as to apply preload to the bearings 53 when the nut 60 is screwed.

As shown in FIG. 12 and FIG. 13, the distal-end-side link hub 33 includes a distal end member 70 and three rotation shaft coupling members 71 provided on the inner surface of the distal end member 70 equidistantly in the circumferential direction. The center of a circle on which the rotation shaft coupling members 71 are arranged, is located on the central axis QB of the distal-end-side link hub 33. To each rotation shaft coupling member 71, a rotation shaft 73 is rotatably coupled such that the axis thereof intersects with the central axis QB of the link hub 33. One end of the corresponding distal-side end link member 36 is coupled to the rotation shaft 73 of the distal-end-side link hub 33. A rotation shaft 75 rotatably coupled to the other end of the corresponding intermediate link member 37, is coupled to the other end of the distal-side end link member 36. As is the case with the rotation shafts 42 and 55, the rotation shaft 73 of the distal-end-side link hub 33 and the rotation shaft 75 of the intermediate link member 37 are rotatably coupled to the rotation shaft coupling member 71 and the other end of the intermediate link member 37 via two bearings (not shown), respectively.

As shown in FIG. 11, the parallel link mechanism 30 is disposed on the Y-axis stage 25, which forms the output portion of the linear motion mechanism 5, by coupling the proximal end member 40 to a base member 80 via a plurality of shafts 81. A cover 82 is attached between the outer circumferential edge of the proximal end member 40 and the outer circumferential edge of the base member 80, and thus a space between the proximal end member 40 and the base member 80 forms an insulated space 83 which is insulated from the outside.

The posture-controlling actuators 31 for actuating the parallel link mechanism 30 are disposed on the proximal end member 40 so as to be located in the insulated space 83. The number of the posture-controlling actuators 31 is three which is the same as the number of the link mechanisms 34. Each posture-controlling actuator 31 is implemented by a rotary actuator such as a motor, and a bevel gear 76 mounted to a rotation output shaft 31a of the posture-controlling actuator 31 and the fan-shaped bevel gear 45 mounted to the rotation shaft 42 of the proximal-end-side link hub 32 are meshed with each other. The bevel gear 76 and the fan-shaped bevel gear 45 cooperate together to form an axis-orthogonal type speed reducer 77. The axis-orthogonal type speed reducer may be formed by using another mechanism (for example, a worm mechanism) other than the bevel gears.

In this example, the posture-controlling actuators 31 are provided, the number of which is equal to that of the link mechanisms 34. However, the posture of the distal-end-side link hub 33 relative to the proximal-end-side link hub 32 can be determined as long as the posture-controlling actuators 31 are provided to at least two of the three link mechanisms 34.

The link actuation device L actuates the parallel link mechanism 30 by rotationally driving the posture-controlling actuators 31. Specifically, when the posture-controlling actuators 31 are rotationally driven, rotation thereof is transmitted to the rotation shaft 42 while the speed of the rotation is reduced via the axis-orthogonal type speed reducer 77, so that the angle of the proximal-side end link member 35 relative to the proximal-end-side link hub 32 is changed. Accordingly, the position and the posture of the distal-end-side link hub 33 relative to the proximal-end-side link hub 32 are determined.

If the link actuation device L is used as the rotation unit 6, as shown in the second embodiment, the following advantages are obtained.

Since all the posture-controlling actuators 31 can be disposed on the fixed side of the link actuation device L, the weight of the movable portion including the shaping table 3 is reduced, and thus, the posture of the shaping table 3 can be changed at high speed.

Since the link actuation device L can be configured to be compact, the three-dimensional shaping device 1 can be configured to be compact.

Since the link actuation device L has a wide range of possible movement, the raw material can be deposited from various angles with respect to the shaping table 3. Specifically, in a case where an imaginary sphere of which the center is located on the shaping surface 3a of the shaping table 3 is assumed, the raw material can be deposited on the shaping table 3 by discharging the raw material from all directions around a hemisphere on the shaping surface 3a side of the imaginary sphere.

Since the link actuation device L is capable of smooth motion in various directions, a shaped product having a complicated shape can also be molded evenly.

Third Embodiment

Figure 16:
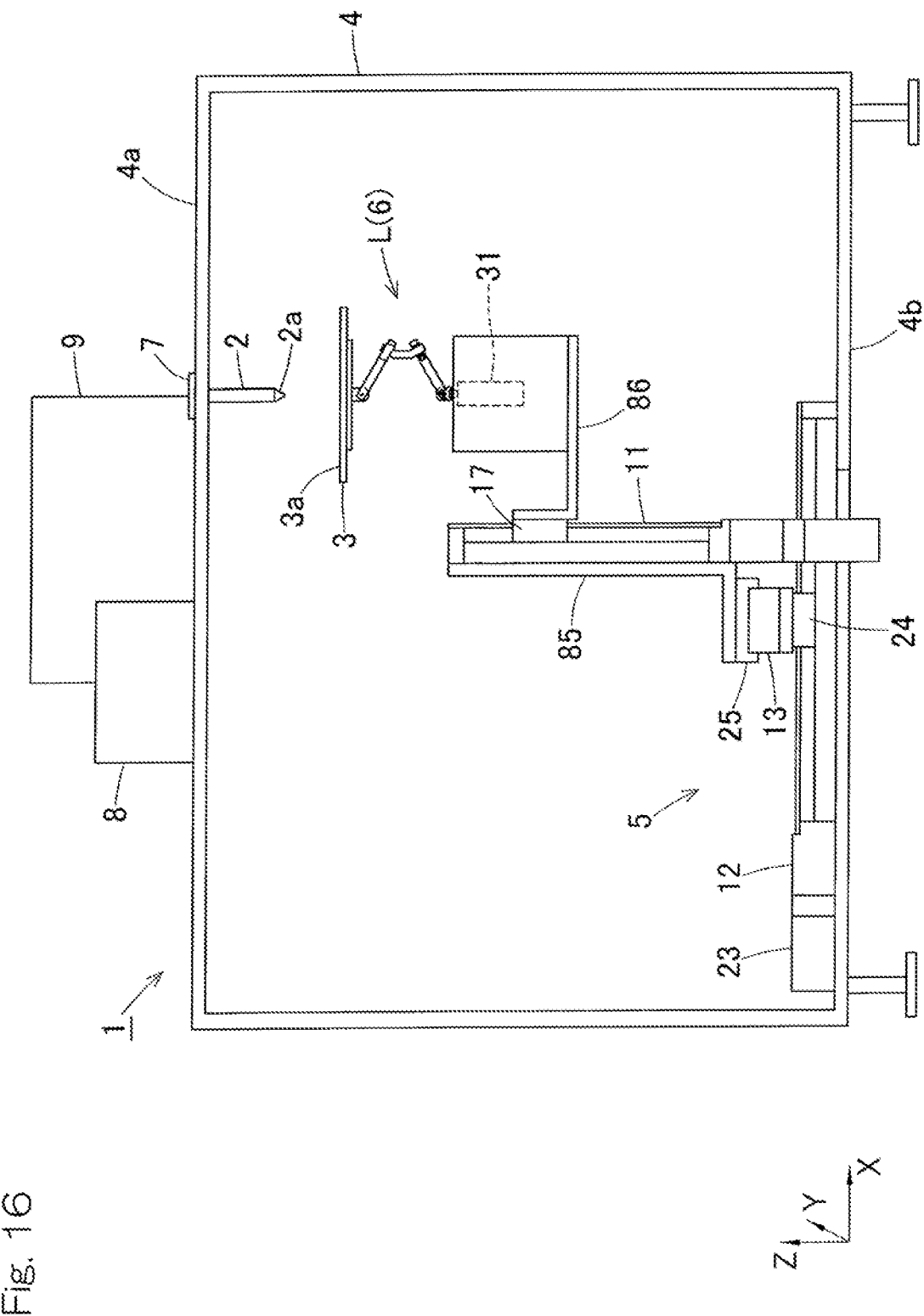
FIG. 16 is a front view showing a schematic configuration of a three-dimensional shaping device according to a third embodiment of the present invention.

FIG. 16 is a front view showing a schematic configuration of a three-dimensional shaping device according to a third embodiment of the present invention. In the three-dimensional shaping device 1, the rotation unit 6 is implemented by the link actuation device L as is the case with the second embodiment described above. In the third embodiment, the configuration of the linear motion mechanism 5 is different from that in the second embodiment. The other components are the same as those in the second embodiment. The same components as those in the second embodiment are denoted by the same reference numerals, and the description thereof is omitted.

The linear motion mechanism 5 in the third embodiment includes the Z-axis linear motion portion 11, the X-axis linear motion portion 12, and the Y-axis linear motion portion 13 as is the case with the second embodiment. However, the arrangement of the linear motion portions 11 to 13 is different from that in the second embodiment. Specifically, the X-axis linear motion portion 12 is disposed on the bottom surface portion 4b of the mount 4, the Y-axis linear motion portion 13 is disposed on the X-axis stage 24 of the X-axis linear motion portion 12, and the Z-axis linear motion portion 11 is disposed on the Y-axis stage 25 of the Y-axis linear motion portion 13 via a bracket 85. The Z-axis linear motion portion 11 does not have a configuration using a ball screw mechanism as shown in the second embodiment, but is implemented by a linear motion actuator. In the third embodiment, the Z-axis stage 17 of the Z-axis linear motion portion 11 serves as the output portion of the linear motion mechanism 5, and the rotation unit 6 is disposed on the Z-axis stage 17 serving as the output portion, via a rotation unit disposition member 86. Also in the third embodiment, operations are performed in the same manner as shown in the second embodiment, and the same advantageous effects as those in the second embodiment are obtained.

Fourth Embodiment

Figure 17:
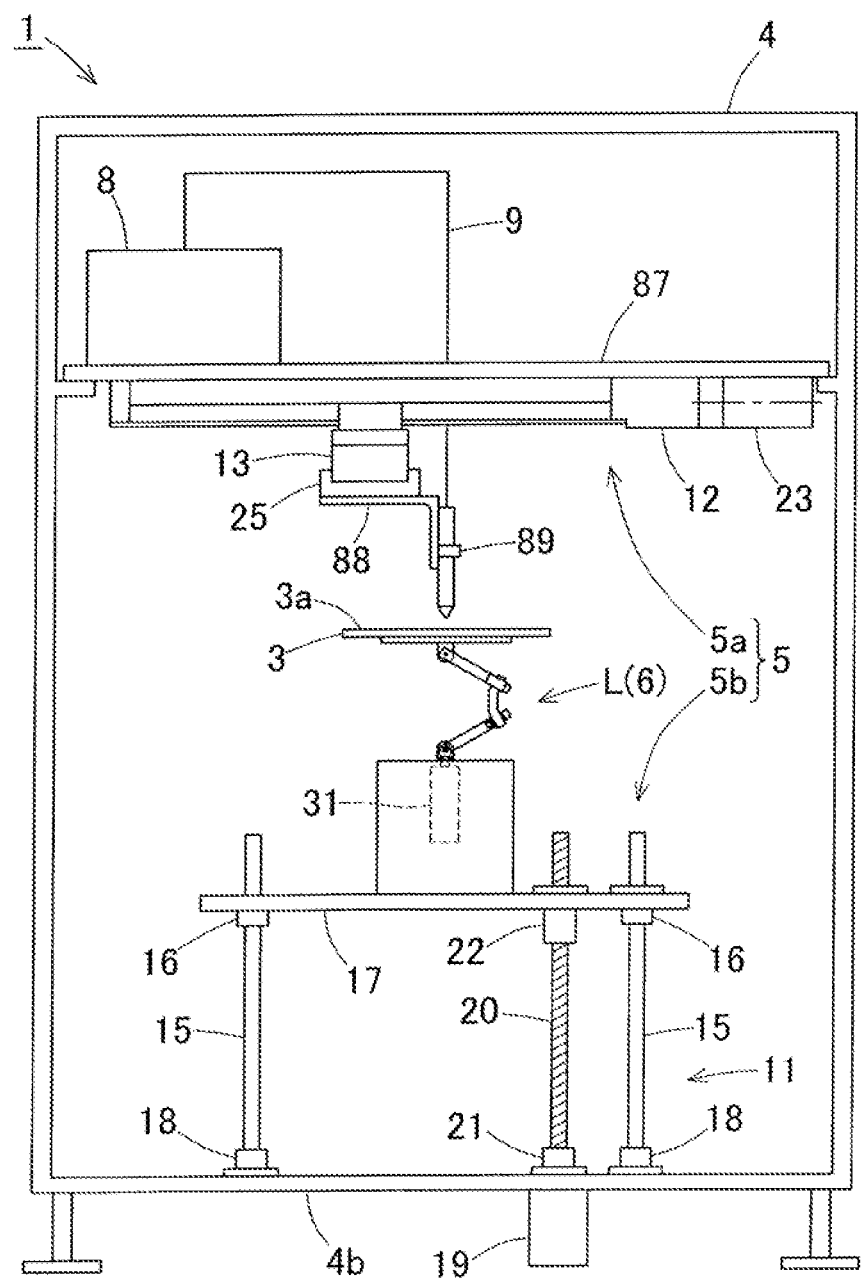
FIG. 17 is a front view showing a schematic configuration of a three-dimensional shaping device according to a fourth embodiment of the present invention.
Figure 17:
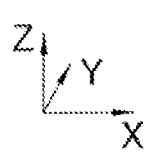

FIG. 17 is a front view showing a schematic configuration of a three-dimensional shaping device according to a fourth embodiment of the present invention. In the three-dimensional shaping device 1, the linear motion mechanism 5 includes: a horizontal-plane linear motion mechanism portion 5a movable in two mutually orthogonal axial directions along a horizontal plane; and a vertical linear motion mechanism portion 5b movable in the vertical direction. The horizontal-plane linear motion mechanism portion 5a is disposed on an intermediate plate 87 of the mount 4, and is formed by combining the X-axis linear motion portion 12 and the Y-axis linear motion portion 13. The intermediate plate 87 is horizontally provided at an intermediate portion, in the vertical direction, of the mount 4. The vertical linear motion mechanism portion 5b includes the Z-axis linear motion portion 11 disposed on the bottom surface portion 4b of the mount 4. The Z-axis linear motion portion 11 has a configuration using a ball screw mechanism, as is the case with the second embodiment.

In the three-dimensional shaping device 1 of the fourth embodiment, a head attachment member 88 is disposed on the Y-axis stage 25 serving as the output portion of the horizontal-plane linear motion mechanism portion 5a, and the discharge head 2 is fixed to the head attachment member 88 by a head-fixing member 89. The rotation unit 6 is mounted to the Z-axis stage 17 of the Z-axis linear motion portion 11 serving as the vertical linear motion mechanism portion 5b, and the shaping table 3 is disposed on the rotation unit 6 such that the shaping surface 3a faces upward. The rotation unit 6 is implemented by the link actuation device L.

Fifth Embodiment

Figure 18:
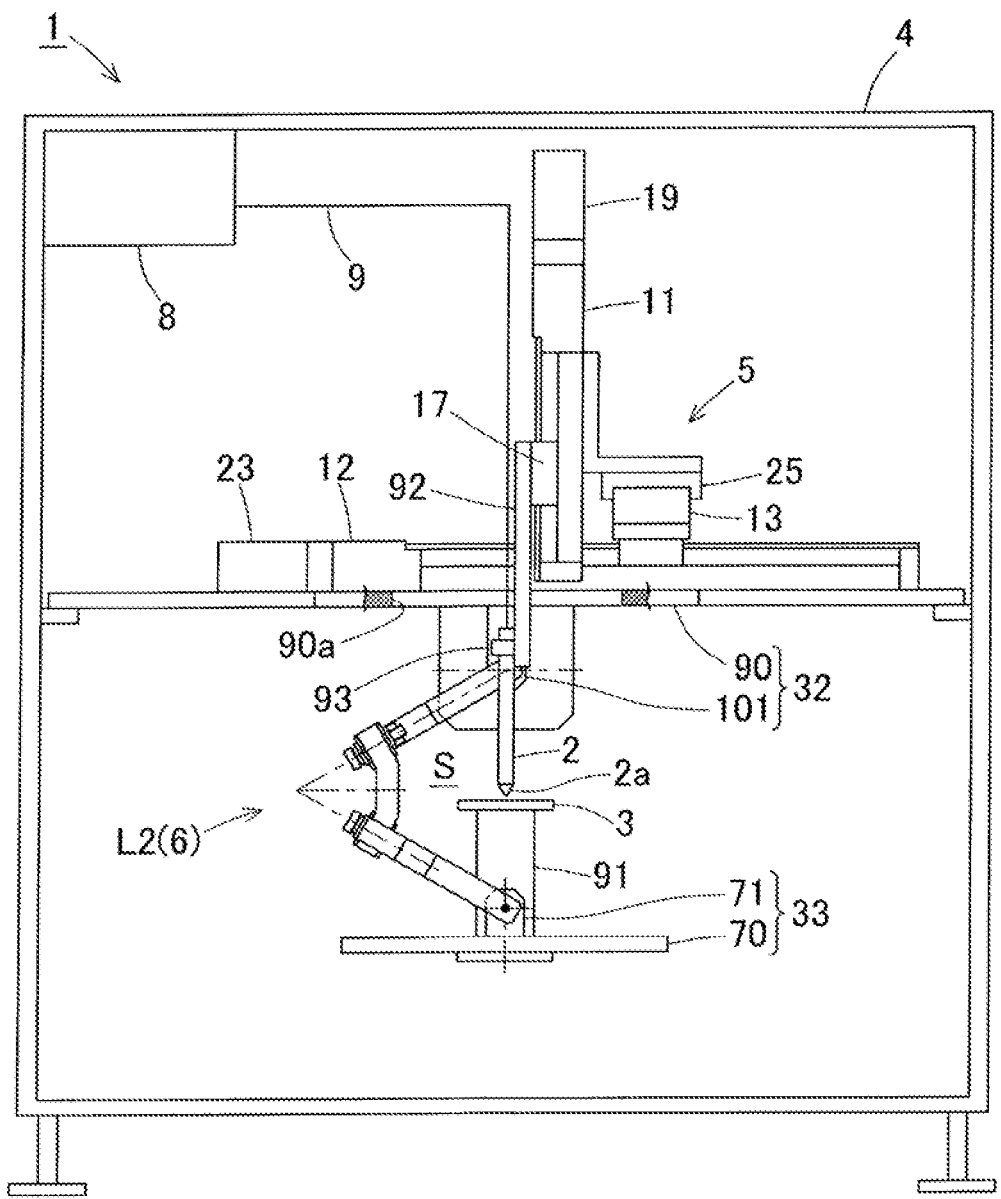
FIG. 18 is a front view showing a schematic configuration of a three-dimensional shaping device, in one state, according to a fifth embodiment of the present invention.
Figure 19:
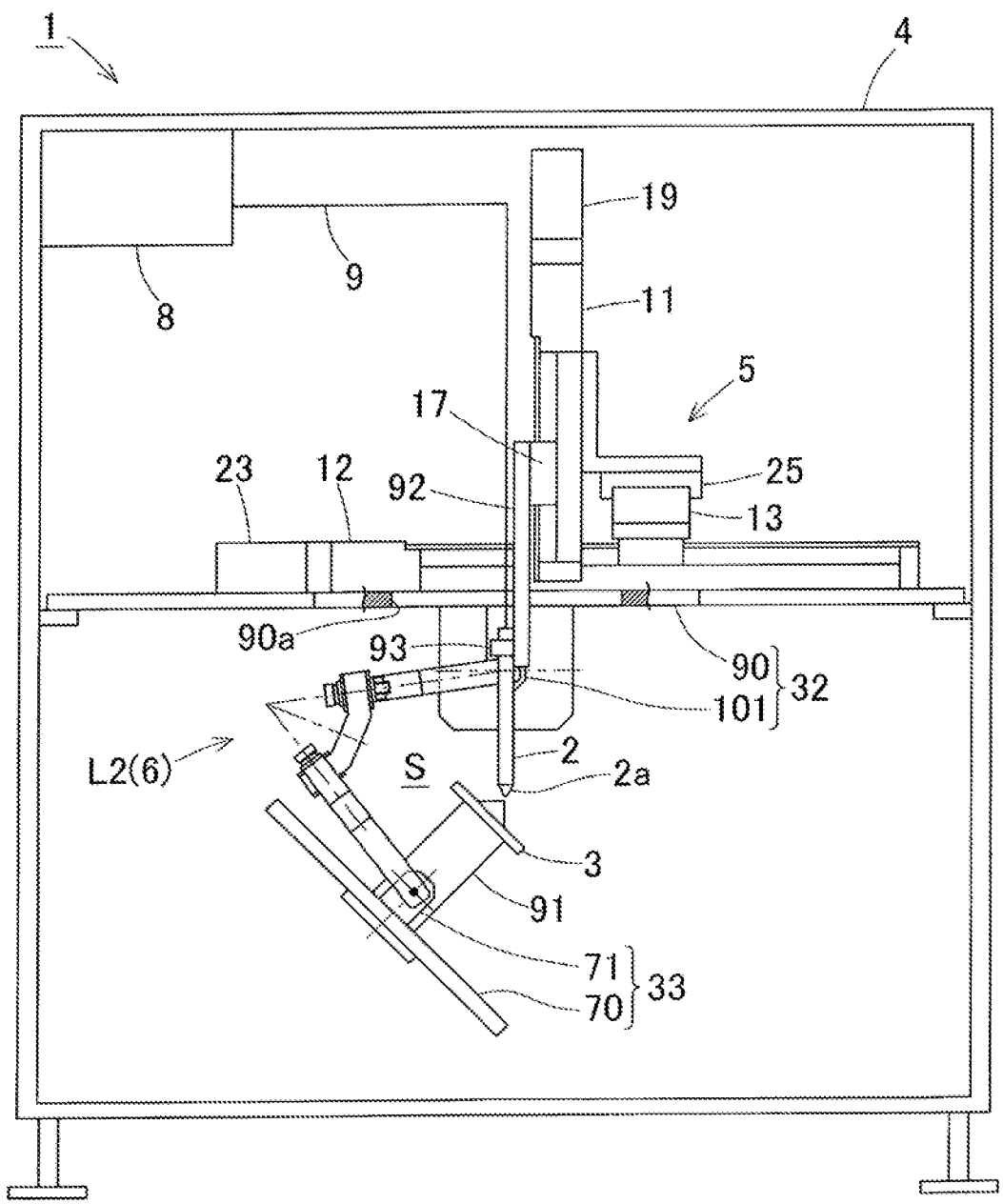
FIG. 19 is a front view showing a schematic configuration of the three-dimensional shaping device in another state.

FIG. 18 and FIG. 19 are front views showing a schematic configuration of a three-dimensional shaping device according to a fifth embodiment of the present invention, and the state of the three-dimensional shaping device is different between FIG. 18 and FIG. 19. The three-dimensional shaping device 1 is different from that in any of the above-mentioned second to fourth embodiments in that a link actuation device L2 serving as the rotation unit 6 is disposed such that the distal-end-side link hub 33 is located below the proximal-end-side link hub 32, and the shaping table 3 is disposed in an inner space S within the three link mechanisms 34.

Specifically, a horizontal intermediate plate 90 is fixed to an intermediate portion, in the vertical direction, of the mount 4, and the link actuation device L2 is disposed on the intermediate plate 90 so as to have a vertically reversed posture. The intermediate plate 90 constitutes a part of the link actuation device L2 as described later. A shaping-table fixing member 91 is disposed on the upper surface of the distal end member 70 of the distal-end-side link hub 33, and the shaping table 3 is fixed on the shaping-table fixing member 91. The shaping table 3 is located in the inner space S.

The linear motion mechanism 5 movable in three mutually orthogonal axial directions is disposed on the intermediate plate 90, and the discharge head 2 is disposed on the Z-axis stage 17 serving as the output portion of the linear motion mechanism 5. Specifically, a head attachment member 92 is disposed on the Z-axis stage 17, and the discharge head 2 is fixed to the head attachment member 92 by a head-fixing member 93. The discharge head 2 is inserted in the inner space S from above through a through hole 90a formed in the intermediate plate 90.

In this configuration, the range in which the discharge head 2 and the shaping table 3 can be moved relative to each other is small, and thus, only a relatively small shaped product can be molded. However, since the strokes of the linear motion portions 11, 12, and 13 of the linear motion mechanism 5 are shortened, the entire three-dimensional shaping device 1 can be made compact, resulting in reduction in cost. In the example in FIG. 18 and FIG. 19, the discharge head 2 is configured to be moved in three mutually orthogonal axial directions by the linear motion mechanism 5. However, the shaping table 3 may be moved in the three mutually orthogonal axial directions together with the link actuation device L2, or both of the discharge head 2 and the shaping table 3 may be moved.

The link actuation device L2 in the fifth embodiment has approximately the same configuration as that of the link actuation device L in any of the above-mentioned second to fourth embodiments, but is different therefrom in some components including a drive mechanism. Hereinafter, components, of the link actuation device L2 in the fifth embodiment, that are different from those of the link actuation device L in any of the second to fourth embodiments, will be described.

Figure 20:
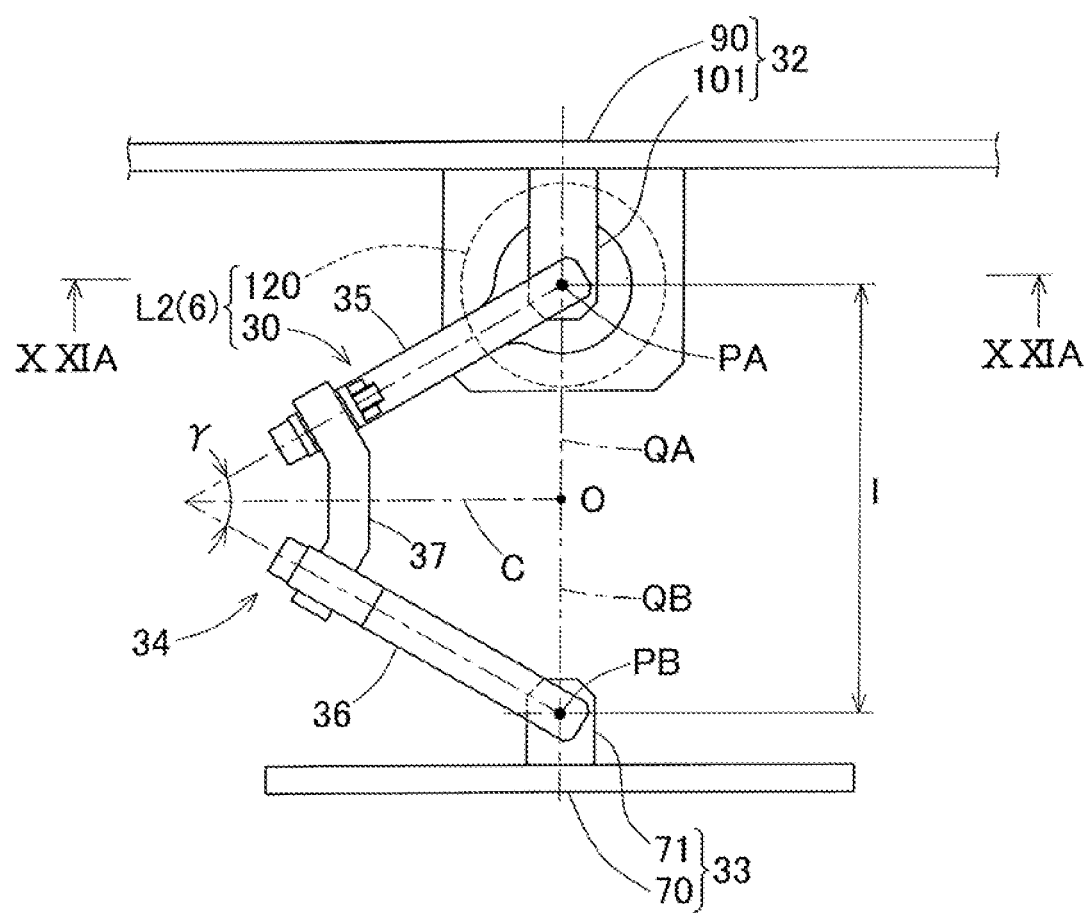
FIG. 20 is a front view of a link actuation device serving as the rotation unit of the three-dimensional shaping device, with a portion of the link actuation device being omitted.
Figure 21A:
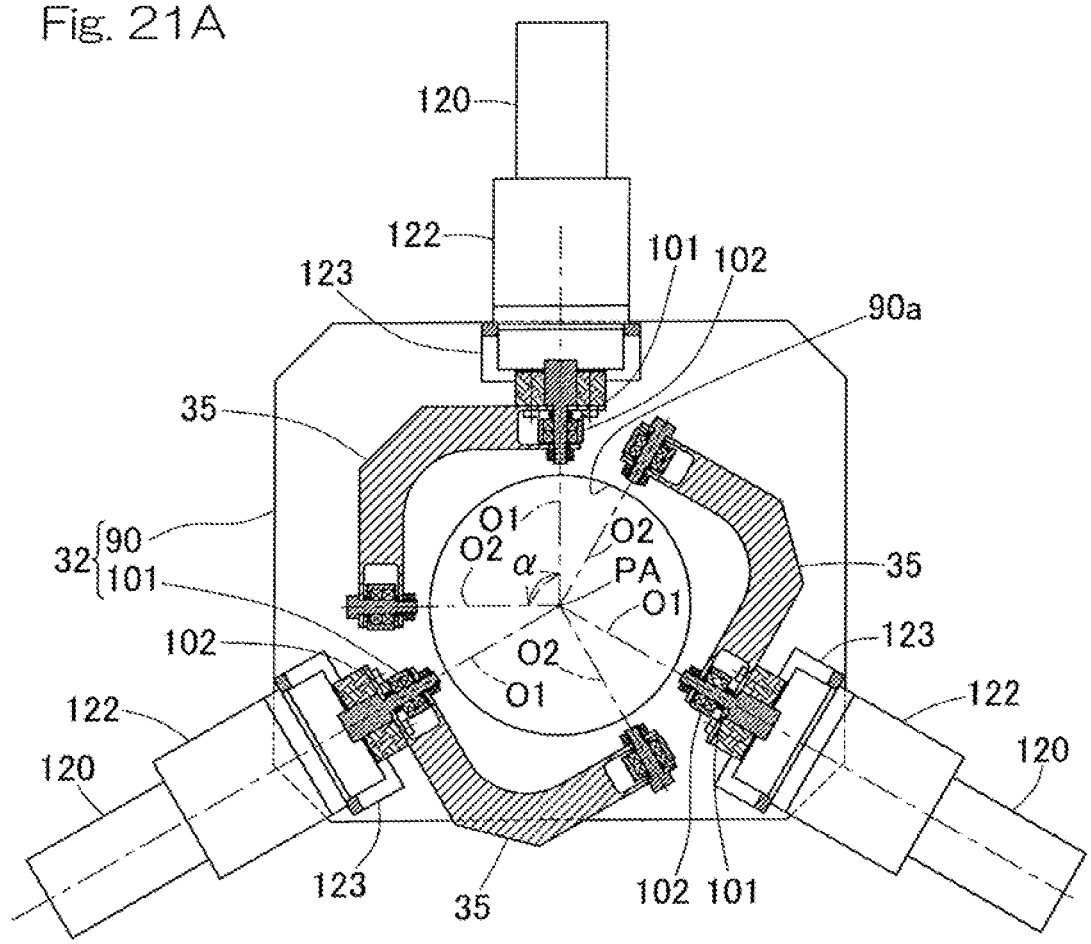
FIG. 21A is a cross-sectional view taken along the line XXIA-XXIA in FIG. 20.
Figure 21B:
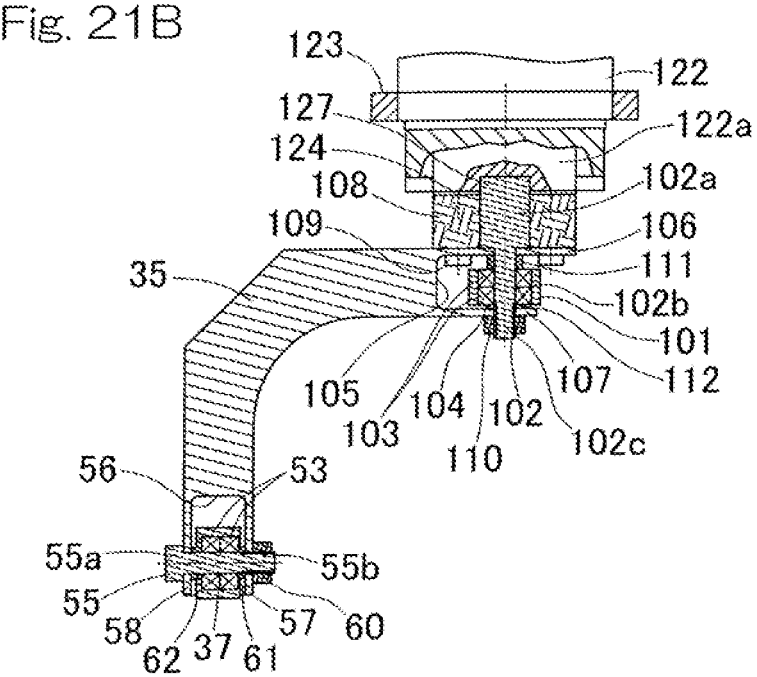
FIG. 21B is a partially enlarged view of FIG. 21A.

FIG. 20 is a front view of the link actuation device L2 with a portion thereof being omitted, FIG. 21A is a cross-sectional view taken along the line XXIA-XXIA in FIG. 20, and FIG. 21B is a partially enlarged view of FIG. 21A. The proximal-end-side link hub 32 includes the intermediate plate 90 and three rotation shaft coupling members 101 provided integrally with the intermediate plate 90. The intermediate plate 90 has the circular through hole 90a at the center portion thereof, and the three rotation shaft coupling members 101 are arranged around the through hole 90a at equal intervals in the circumferential direction. The center of the through hole 90a is located on the central axis QA of the proximal-end-side link hub 32. To the rotation shaft coupling members 101, respective rotation shafts 102 are rotatably coupled such that the axes thereof intersect with the central axis QA of the proximal-end-side link hub 32. To these rotation shafts 102, one ends of the respective proximal-side end link members 35 are coupled.

As shown in FIG. 21B, each rotation shaft 102 has a large-diameter portion 102a, a small-diameter portion 102b, and an external thread portion 102c, and is rotatably supported, at the small-diameter portion 102b, by the corresponding rotation shaft coupling member 101 via two bearings 103. The bearings 103 are each a ball bearing such as a deep groove ball bearing or an angular contact ball bearing, for example. These bearings 103 are disposed, in a fitted manner, in an inner-diameter hole 104 formed in the rotation shaft coupling member 101, and are fixed by a method such as press fit, adhesion, or crimping.

The rotation shaft 102 is disposed such that the large-diameter portion 102a thereof is coaxial with an output shaft 122a of a speed reduction mechanism 122 (described later). The arrangement structure thereof will be described later. One end of the corresponding proximal-side end link member 35 is coupled to the rotation shaft 102 so as to rotate integrally with the rotation shaft 102. Specifically, the rotation shaft coupling member 101 is disposed in a cut portion 105 formed in the one end of the proximal-side end link member 35, and the small-diameter portion 102b of the rotation shaft 102 is inserted into hollows of inner rings of the bearings 103 and through holes respectively formed in a pair of inner and outer rotation shaft support portions 106 and 107 which form opposed side portions of the cut portion 105 defined at the one end of the proximal-side end link member 35. The proximal-side end link member 35 and the output shaft 122a of the speed reduction mechanism 122 are fixed by means of bolts 109 via a spacer 108 fitted to the outer circumference of the large-diameter portion 102a of the rotation shaft 102, and then, a nut 110 is screwed onto the external thread portion 102c, of the rotation shaft 102, which projects from the outer rotation shaft support portion 107. Spacers 111 and 112 are interposed between the inner rings of the bearings 103 and the pair of rotation shaft support portions 106 and 107 so as to apply preload to the bearings 103 when the nut 110 is screwed.

A portion at which the other end of the proximal-side end link member 35 and the intermediate link member 37 are coupled, is the same as that in the second embodiment. In addition, a portion at which the distal-end-side link hub 33 and the distal-side end link member 36 are coupled, and a portion at which the distal-side end link member 36 and the intermediate link member 37 are coupled, are also the same as those in the second embodiment.

Posture-controlling actuators 120 of the link actuation device L2 are each a rotary actuator including the corresponding speed reduction mechanism 122, and are each disposed on the lower surface of the intermediate plate 90 of the proximal-end-side link hub 32 coaxially with the corresponding rotation shaft 102. The posture-controlling actuator 120 and the speed reduction mechanism 122 are provided integrally with each other, and the speed reduction mechanism 122 is fixed to the intermediate plate 90 by a motor-fixing member 123. In this example, the posture-controlling actuators 120 are provided to all of the three link mechanisms 34. However, the posture of the distal-end-side link hub 33 relative to that of the proximal-end-side link hub 32 can be determined as long as the posture-controlling actuators 120 are provided to at least two of the three link mechanisms 34.

In FIG. 21B, the speed reduction mechanism 122 is of a flange output type, and has the output shaft 122a having a large diameter. The distal end surface of the output shaft 122a is formed by a flat flange surface 124 orthogonal to the center line of the output shaft 122a. As described above, the output shaft 122a is connected to the rotation shaft support portion 106 of the proximal-side end link member 35 by means of the bolts 109 via the spacer 108. The large-diameter portion 102a of the rotation shaft 102 at the revolute pair portion between the proximal-end-side link hub 32 and the proximal-side end link member 35 is fitted in an inner-diameter groove 127 formed in the output shaft 122a of the speed reduction mechanism 122.

Sixth Embodiment

Figure 22:
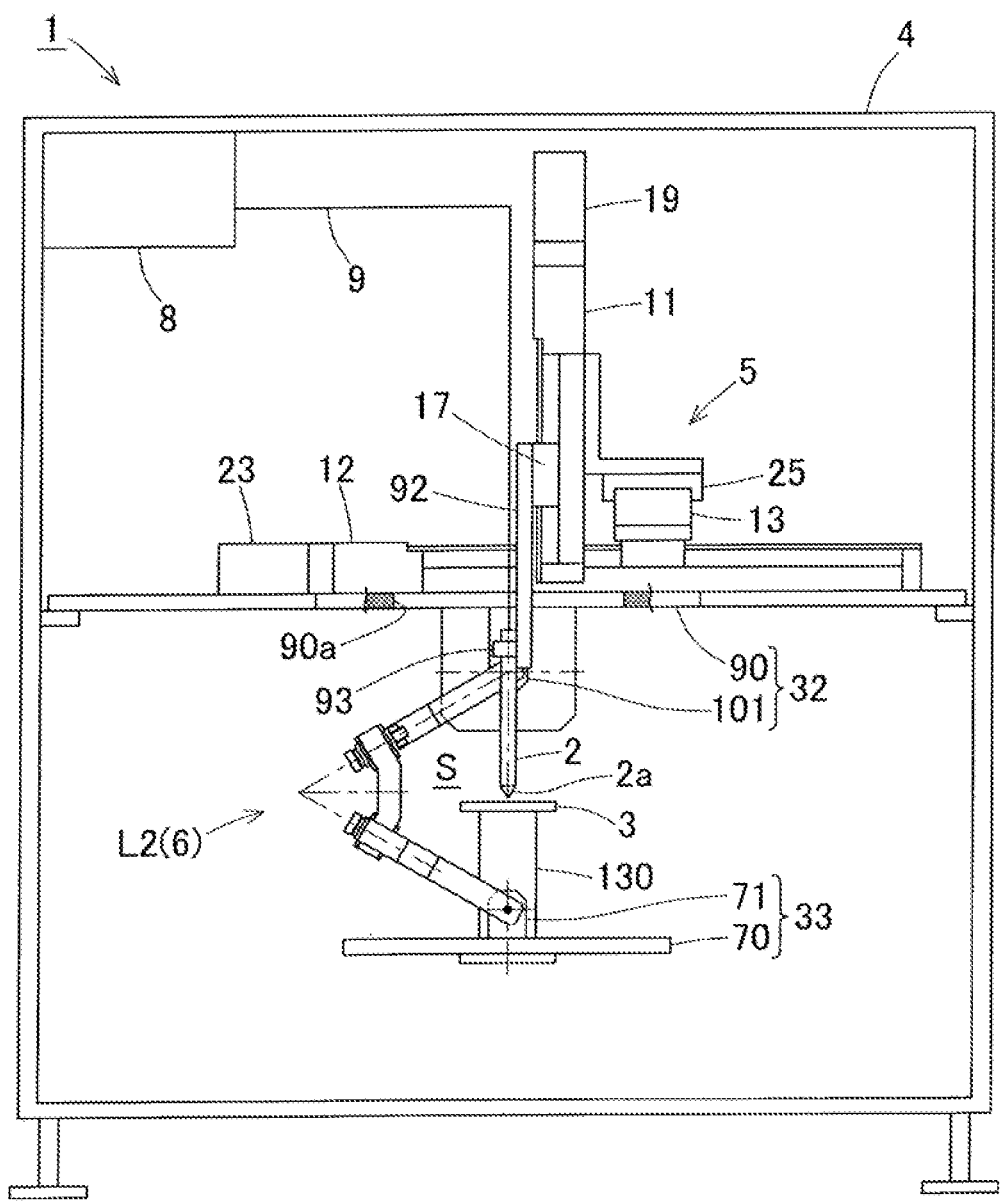
FIG. 22 is a front view showing a schematic configuration of a three-dimensional shaping device according to a sixth embodiment of the present invention.

FIG. 22 is a front view showing a schematic configuration of a three-dimensional shaping device according to a sixth embodiment of the present invention. The three-dimensional shaping device 1 includes, instead of the shaping-table fixing member 91 in the fifth embodiment (FIG. 18 and FIG. 19), a table linear motion mechanism 130 movable along the central axis QB of the distal-end-side link hub 33. In this configuration, since the shaping table 3 can be moved along the central axis QB of the distal-end-side link hub 33, the stroke of the linear motion mechanism 5, especially of the Z-axis linear motion portion 11, can be shortened. In addition, a shaped product having a larger size, especially a larger height dimension, than that in the fifth embodiment can be molded.

In the above-described first to sixth embodiments, the shaping method for the shaped product is not limited to the fused deposition modeling method, but other methods such as an inkjet method, a selective laser sintering method or powder sintering method, and a powder plaster molding method may be employed.

Although the present invention has been fully described in connection with the preferred embodiments thereof with reference to the accompanying drawings, numerous additions, changes, or deletions can be made without departing from the gist of the present invention. Therefore, such additions, changes, and deletions are also construed as included within the scope of the present invention.

REFERENCE NUMERALS

1 . . . three-dimensional shaping device
2 . . . discharge head
2a . . . nozzle
3 . . . shaping table
3a . . . shaping surface
5 . . . linear motion mechanism
5a . . . horizontal-plane linear motion mechanism portion
5b . . . vertical linear motion mechanism portion
6 . . . rotation unit
31 . . . posture-controlling actuator
32 . . . proximal-end-side link hub
33 . . . distal-end-side link hub
34 . . . link mechanism
35 . . . proximal-side end link member
36 . . . distal-side end link member
37 . . . intermediate link member
90 . . . intermediate plate (proximal-end-side link hub)
90a . . . through hole
L, L2 . . . link actuation device
S . . . inner space

What is claimed is:

1. A three-dimensional shaping device configured to repeatedly perform, while changing a relative position between a discharge head and a shaping table, an operation of discharging fluidic raw material through a nozzle of the discharge head, thereby molding a shaped product, the three-dimensional shaping device comprising:
the discharge head;
the shaping table;
a linear motion mechanism configured to move the shaping table relative to the discharge head in three mutually orthogonal axial directions; and
a rotation unit mounted to the linear motion mechanism and configured to tilt the shaping table relative to the discharge head,
the rotation unit is a link actuation device having two degrees of rotational freedom, the link actuation device including:
a proximal-end-side link hub including a proximal end member coupled to a base member, the base member being fixed to an output portion of the linear motion mechanism,
a distal-end-side link hub,
three or more link mechanisms via which the distal-end-side link hub is coupled to the proximal-end-side link hub such that a posture of the distal-end-side link hub is changeable relative to a posture of the proximal-end-side link hub, each link mechanism among the three or more link mechanisms including:
a proximal-side end link member having one end rotatably coupled to the proximal-end-side link hub,
a distal-side end link member having one end rotatably coupled to the distal-end-side link hub, and
an intermediate link member having opposed ends rotatably coupled respectively to other ends of the proximal-side and distal-side end link members, and
a plurality of posture-controlling actuators disposed on the proximal end member and within an interior space between the proximal end member and the base member and configured to arbitrarily change the posture of the distal-end-side link hub relative to the posture of the proximal-end-side link hub,
wherein
the shaping table is disposed on the distal-end-side link hub of the rotation unit such that a shaping surface of the shaping table faces the nozzle of the discharge head and supports the shaped product.

2. The three-dimensional shaping device as claimed in claim 1, wherein
the plurality of posture-controlling actuators comprises at least three posture-controlling actuators, and
each posture-controlling actuator among the plurality of posture-controlling actuators is provided to each link mechanism among the three or more link mechanisms.

3. The three-dimensional shaping device as claimed in claim 1, wherein a position and a posture of the discharge head are fixed.

4. The three-dimensional shaping device as claimed in claim 1, wherein the three-dimensional shaping device is configured to mold the shaped product through a fused deposition modeling operation.

\* \* \* \* \*